(12) United States Patent
Osumi et al.

(10) Patent No.: US 6,280,513 B1
(45) Date of Patent: Aug. 28, 2001

(54) INK, INK SET, INK CARTRIDGE, RECORDING UNIT, IMAGE RECORDING APPARATUS AND IMAGE RECORDING METHOD

(75) Inventors: Koichi Osumi, Yokohama; Yoshifumi Hattori, Yamato; Yoshihisa Takizawa, Machida; Shinya Mishina, Kawasaki; Mikio Sanada, Yokohama; Hisashi Teraoka; Yuko Yakushigawa, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/271,248

(22) Filed: Mar. 17, 1999

(30) Foreign Application Priority Data

Mar. 20, 1998 (JP) .................................. 10-072224
Oct. 27, 1998 (JP) .................................. 10-305742
Mar. 15, 1999 (JP) .................................. 11-068272

(51) Int. Cl.$^7$ .................................................. C09D 11/02
(52) U.S. Cl. ................... 106/31.6; 106/31.75; 106/31.86
(58) Field of Search ................................. 106/31.6, 31.75, 106/31.86

(56) References Cited

U.S. PATENT DOCUMENTS

| | | | |
|---|---|---|---|
| 5,356,464 | 10/1994 | Hickman et al. | 106/31.58 |
| 5,427,611 | 6/1995 | Shirota et al. | 106/31.29 |
| 5,451,251 | 9/1995 | Mafune et al. | 106/34.43 |
| 5,571,311 | 11/1996 | Belmont et al. | 106/31.6 |
| 5,571,313 | 11/1996 | Mafune et al. | 106/31.43 |
| 5,609,671 | 3/1997 | Nagasawa | 106/31.6 |
| 5,623,294 | 4/1997 | Takizawa et al. | 347/98 |
| 5,630,868 * | 5/1997 | Belmont et al. | 106/31.75 |
| 5,672,198 * | 9/1997 | Belmont | 106/31.75 |
| 5,707,432 * | 1/1998 | Adams et al. | 106/31.6 |
| 5,746,818 | 5/1998 | Yatake | 106/31.86 |
| 5,762,695 | 6/1998 | Wong et al. | 106/31.89 |
| 5,803,959 * | 9/1998 | Johnson et al. | 106/31.75 |
| 5,851,274 * | 12/1998 | Lin | 106/31.75 |
| 5,865,883 | 2/1999 | Teraoka et al. | 106/31.32 |
| 5,885,335 * | 3/1999 | Adams et al. | 106/31.6 |
| 5,922,118 * | 7/1999 | Johnson et al. | 106/31.6 |
| 5,928,416 * | 7/1999 | Gundlach et al. | 106/31.86 |
| 5,958,121 * | 9/1999 | Lin | 106/31.75 |
| 5,976,233 * | 11/1999 | Osumi et al. | 106/31.86 |
| 6,004,389 * | 12/1999 | Yatake | 106/31.86 |

FOREIGN PATENT DOCUMENTS

| | | |
|---|---|---|
| 0 733 682 A1 | 9/1996 | (EP) . |
| 0 802 2247 A2 | 10/1997 | (EP) . |
| 55-065269 | 5/1980 | (JP) . |
| 55-066976 | 5/1980 | (JP) . |
| 63-152681 | 6/1988 | (JP) . |
| 64-6074 | 1/1989 | (JP) . |
| 8-003498 | 1/1996 | (JP) . |

\* cited by examiner

*Primary Examiner*—Helene Klemanski
(74) *Attorney, Agent, or Firm*—Fitzpatrick, Cella, Harper & Scinto

(57) ABSTRACT

Provided is a black ink capable of mitigating the dependency on image quality of recording media and giving a high quality image stably, which comprises at least one salt selected from the group consisting of $(M1)_2SO_4$, $CH_3COO(M1)$, $Ph\_COO(M1)$, $(M1)NO_3$, $(M1)Cl$, $(M1)Br$, $(M1)I$, $(M1)_2SO_3$ and $(M1)_2CO_3$, where M1 is an alkali metal, ammonium or organo-ammonium and Ph is a phenyl group, and a self dispersible carbon black.

37 Claims, 8 Drawing Sheets

INK, INK SET, INK CARTRIDGE, RECORDING UNIT, IMAGE RECORDING APPARATUS AND IMAGE RECORDING METHOD

BACKGROUND OF THE INVENTION

1. Field of the Invention

The present invention relates to an ink, an ink set, an ink cartridge, a recording unit, an image recording apparatus and an image recording method.

2. Related Background Art

Hitherto, as a black ink for writing implements such as fountain pen, sign pen or ball-point pen and a black ink for an ink-jet printer, an ink using carbon black, a black colorant, high in optical density of image and excellent in fastness has been proposed. Especially in recent years, a detailed research and development has been made from diverse aspects such as composition and property of the ink, so as to perform a good recording even on plain paper such as copy paper used generally in offices, report paper, notebook paper, letter paper, bond paper and serial slip paper. For example, Japanese Patent Application Laid-Open Nos. 63-152681 and 64-6074 disclose a water-based pigment ink containing carbon black and a dispersant. Besides, Japanese Patent Application Laid-Open No. 8-3498 mentions technical problems that ejection becomes unstable and no sufficient printing density cannot be obtained when an ink containing carbon black together with a dispersant is used as ink for ink-jet printer, and it discloses a water-based pigment ink comprising a self dispersible carbon black using no dispersant as an ink capable of solving such problems.

SUMMARY OF THE INVENTION

The present inventors have made various examinations on cases of using a black ink containing the above self dispersible carbon black as a black pigment for ink-jet recording. As a result, it has been found a case that insufficient character quality or insufficient image density is obtained depending on types of recording media such as paper and the like.

Besides, in printing color images by using such a black ink as mentioned above together with other color ink such as at least one color ink selected from magenta ink, cyan ink, yellow ink, red ink, green ink and blue ink, there has been recognized a phenomenon that an image quality is lowered by blotting of ink at the boundary between the black image portion and the color image portion on a recording medium and by non-uniform mix of ink (hereinafter, referred to as "bleeding").

In order to prevent or reduce such bleeding, an idea of promoting the permeability of ink into recording media by addition of a so-called surfactant (such as, e.g. Japanese Patent Application Laid-Open No. 55-65269) or an idea of mainly employing volatile solvent as a solvent of ink (such as, e.g. Japanese Patent Application Laid-Open No. 55-66976) has been proposed. Also with these background techniques, however, a decrease in optical density of image and a decrease in ejection stability were brought about in some cases. In consideration of such background techniques, the present inventors have found that it is necessary to develop a black ink hardly changing in image quality even when types of recording media may be varied, in a case using the ink singly or a combination thereof with other color ink, with respect to an ink comprising a self dispersible carbon black as black pigment.

It is one object of the present invention to provide a black ink capable of mitigating an influence of recording media to an image quality and providing a black ink which can provide a high quality image stably.

It is one object of the present invention to provide a black ink capable of mitigating an influence of recording media to an image quality and providing a black ink which can provide a high quality image stably and is excellent in ink-jet ejection characteristics.

It is another object of the present invention to provide an ink set capable of effectively inhibiting the bleeding. Especially, because a black ink is often used for outputting characters or the like, a high OD (optical density) and a large difference in sharpness of characters are strongly required. Thus, in a technical skill for preventing the bleeding by using highly permeable ink as mentioned above, both character quality grade and OD have not yet been satisfied at a high level. It is also an object of the present invention to satisfy both character quality grade and OD at a higher level.

Furthermore, it is a further object of the present invention to provide an image recording apparatus and an image recording method, capable of mitigating an influence of recording media to an image quality and providing a high quality image stably, and moreover an ink cartridge and a recording unit used for them.

The above objects can be achieved by the present invention described below.

According to a first aspect of the present invention, there is provided an aqueous ink comprising at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, where M1 is an alkali metal, ammonium or organo-ammonium and Ph means a phenyl group, and a self dispersible carbon black.

According to this embodiment, a high grade image can be formed even in the character printing on highly permeable paper which may cause damaging an image grade, such as sharpness of characters, or lowering the image density. Incidentally, the reason why such an effect is obtained according to this embodiment is obscure, but is attributable to a rapid occurrence of solid-liquid separation after deposited to the paper surface in contrast to the stable dispersion of pigments in ink, for example when the ink is ejected and deposited to paper surface by the ink jet method. In other words, a slow solid-liquid separation allows ink to diffuse all over the paper for paper having a high permeability. As a result, a decrease in optical density of image as well as damages on the sharpness of characters (character quality grade) is naturally derived from a permeation of ink into the depth of paper. Since a solid-liquid separation occurs rapidly in paper according to this embodiment, however, the above phenomenon is considered to become difficult to occur for paper relatively high in permeability. In brief, it is considered to become insusceptible to factors such as degree of permeability dependent on the type of paper. And such an effect seems to be best obtained for 0.05 to 10% by weight of salts relative to the whole weight of ink. Furthermore, sulfates such as potassium sulfate or benzoates such as ammonium benzoate slightly affect the characteristics of the above ink, e.g. in use for ink-jet printing.

Besides, as another example of ink according to this embodiment, an ink comprising a self dispersible carbon black, on the surface of which at least one selected from $-COO(M2)$, $-SO_3(M2)_2$ and $-PO_3H(M2)$ is bonded directly or via other atomic groups, and a salt in which M1 and M2 are identical is mentioned. On account of its still better stability, this is one of the preferred embodiments. With M2 of ammonium (NH$_4$), for example, addition of an ammonium salt, e.g. ammonium benzoate, as a salt to ink can further improve the water fastness or the like of ink-jet recording images obtained.

Besides, as another embodiment of the above ink, ink the pH of which is set to 9 to 12 can be mentioned, and the ink is also employed appropriately in stably obtaining a high grade image. Namely, a knowledge about the above ink that a long-period preservation brings about an acidic shift of pH, leading to various changes in characteristics such as an increase in viscosity of ink, has been obtained. And, a further examination on this point revealed a new knowledge that a change in characteristics of ink becomes extremely slow when the pH of ink is set within the above range and a change in characteristics accompanying the ink pH change during the preservation becomes as slight as substantially negligible. And, the above invention is based on such the knowledge.

And as a still another embodiment of the above ink, those coexistent with an stabilizer selected from anionic surfactant, cationic surfactant and the like, for example, can be mentioned. Such a composition permits a change in the characteristics of ink accompanying the pH change of ink to be mitigated. The reason for such an effect is obscure, but the stabilizer seems to hinder the mutual contact (collision) between the particles of carbon black, thus resulting in an extension of the pH range within which ink can stably exist. And, such an effect is significant especially in use of alkylbenzenesulfonate as a stabilizer. As one preferred embodiment, ink so prepared within a pH range of 9 to 12 with addition of a stabilizer is mentioned. This embodiment displays both effects of inhibiting a change in pH during the preservation of ink and preventing a radical change in characteristics accompanying the pH change. Furthermore, the added amount of a stabilizer can be lowered and a possibility of ink characteristics changing can be almost eliminated.

Besides, as a still further embodiment of the present invention, the addition of an antioxidant to ink according to various embodiments mentioned above is mentioned. Use of it can inhibit a chemical change during the long-period preservation of ink and a change in the ejection property of ink-jet printing.

Still further, as another embodiment of the present invention, the addition of a water-soluble polymer compound to according to various embodiments mentioned above is mentioned. Use of it is effective in promoting the frictional resistance of the recording medium for recording on the ink-deposited surface of recording medium such as paper.

According to further aspect of the present invention, there is also provided an ink for forming a predetermined optical density of print image on a recording medium by an ink-jet method, wherein said ink comprises at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, where M1 is an alkali metal, ammonium or organic ammonium and Ph is a phenyl group, and a self dispersible carbon black; and wherein concentration of said carbon black is concentration that the predetermined optical density of image cannot be obtained in case that no salt is contained.

According to further aspect of the present invention, there is also provided an ink set comprising a combination of an aqueous color ink comprising at least one coloring material selected from color materials for cyan, for magenta, for yellow, for red, for green and for blue and an aqueous ink comprising at least one salt selected from (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$ and a self dispersible carbon black, where M1 is an alkali metal, ammonium or an organo-ammonium and Ph means a phenyl group.

When color images are formed using the ink set, the bleeding at the boundary area between an image formed with ink containing carbon black and an image formed with ink containing other coloring materials can be effectively inhibited. The reason for such an effect obtained according to this embodiment is obscure, but a rapid solid-liquid separation on the recording medium surface seems to be related with this effect.

According to further aspect of the present invention, there is further provided an ink cartridge equipped with an ink tank containing a water-based color ink comprising at least one salt selected from (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$ and a self dispersible carbon black.

According to further aspect of the present invention, there is provided a recording unit equipped with an ink container containing a water-based ink comprising at least one salt selected from (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, and a self dispersible carbon black; and a head section for ejecting the ink.

According to further aspect of the present invention, there is provided an image recording apparatus comprising an ink cartridge equipped with an ink tank containing an aqueous ink comprising at least one salt selected from (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, and a self dispersible carbon black; a recording head for ejecting the ink; and supply means for supplying the ink from the ink cartridge to the recording head.

According to further aspect of the present invention, there is provided an image recording apparatus comprising a recording unit equipped with an ink holding section for holding an aqueous ink comprising at least one salt selected from (M1)$_2$SO$_4$, CH$_3$COO(M1), Ph—COO(M1), (M1)NO$_3$ (M1)Cl, (M1)Br, (M1)I, (M1)$_2$SO$_3$ and (M1)$_2$CO$_3$ and a self dispersible carbon black; and a head section for ejecting the ink.

According to further aspect of the present invention, there is provided an image recording apparatus comprising an ink container holding an aqueous ink comprising at least one coloring material selected from coloring materials for cyan, for magenta, for yellow, for red, for green and for blue; an ink container holding an aqueous ink comprising at least one salt selected from (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, and a self dispersible carbon black; and a head section for respectively ejecting the inks held in the respective ink holding sections.

According to further aspect of the present invention, there is provided an image recording apparatus comprising an ink cartridge equipped with an ink container portion holding an aqueous ink comprising at least one coloring material selected from coloring materials for cyan, for magenta, for yellow, for red, for green and for blue, an ink cartridge equipped with an ink container portion holding an aqueous ink comprising at least one salt selected from (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, and a self dispersible carbon black; a head section for respectively ejecting the ink held in the respective ink cartridges; and supply means for supplying the respective ink from the respective ink cartridges to the respective head sections.

According to further aspect of the present invention, there is provided an image recording method comprising the steps of: ejecting an aqueous ink comprising at least one salt selected from $(M1)_2SO_4$, $CH_3COO(M1)$, Ph—COO(M1), $(M1)NO_3$, $(M1)Cl$, $(M1)Br$, $(M1)I$, $(M1)_2SO_3$ and $(M1)_2CO_3$, and a self dispersible carbon black, toward a recording medium; and depositing the ink to a surface of the recording medium, thereby recording images.

According to further aspect of the present invention, there is provided an image recording method comprising the steps of: ejecting a first aqueous ink comprising at least one coloring material selected from coloring materials for cyan, for magenta, for yellow, for red, for green and for blue, toward a recording medium and depositing the ink to a surface of the recording medium; ejecting a second aqueous ink comprising at least one salt selected from $(M1)_2SO_4$, $CH_3COO(M1)$, ph—COO(M1), $(M1)NO_3$, $(M1)Cl$, $(M1)Br$, $(M1)I$, $(M1)_2SO_3$ and $(M1)_2CO_3$, and a self dispersible carbon black toward a recording medium and depositing the ink to a surface of the recording medium.

DETAILED DESCRIPTION OF THE PREFERRED EMBODIMENTS

First Embodiment

Figure 1:
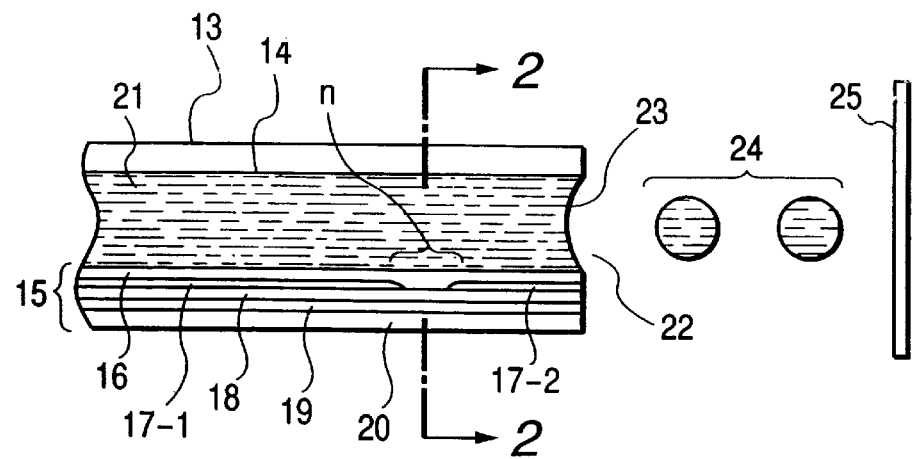
FIG. 1 is a longitudinal cross-sectional view of a head of an ink-jet recording apparatus according to an embodiment of the present invention.

Ink according to one embodiment of the present invention has one feature in comprising a self dispersible carbon black as one coloring material and further a salt. And, these constitute an ink, dispersed or dissolved, e.g., in an aqueous medium.

(Self dispersible carbon black and Salt)

As a self dispersible carbon black, the coloring material for an ink, carbon black, on the surface of which at least one hydrophilic group directly or via other atomic groups is bonded, is mentioned. Its use eliminates the need for a dispersant to have formerly been added for the dispersion of carbon black particles.

As salts, it is preferable to use at least one selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$ and $(M1)_2CO_3$. Here, M1 is an alkali metal, ammonium or an organo-ammonium and Ph means a phenyl group. And, specific examples of alkali metals include Li, Na, K, Rb, Cs and the like, while specific ones of organo-ammoniums include methyl ammonium, dimethyl ammonium, trimethyl ammonium, ethyl ammonium, diethyl ammonium, triethyl ammonium, trimethanol ammonium, dimethanol ammonium, ethanol ammonium, diethanol ammonium and triethanol ammonium.

Like this, by allowing salts as mentioned above to coexist in ink comprising a self dispersible carbon black, stable ink not greatly varying in image quality with different types of recording media can be obtained to form a high quality image. The detailed mechanism that the ink according to this embodiment displays such the characteristics is not clear presently. However, it has been found out by the present inventors with respect to a Ka value obtained by the Bristow method, known as a measure indicating the permeability of ink to a recording medium, that the claimed ink indicates a higher Ka value than that of an ink having the same composition except for the content of salts. An increase in Ka value represents a promoted permeability of ink to a recording paper and a promoted permeability of ink signifies a decrease in an optical density of image as common knowledge of those skilled in the art. Namely, it is a common knowledge of those skilled in the art that not only ink but also coloring materials permeate into a recording medium, thus resulting in a decrease in optical density of image. And, comprehensively judging from such various knowledges about ink, a salt in ink according to the present invention seems to induce a specific action of very rapidly causing the separation of the solvent and the solid component (solid-liquid separation) in ink after given on a paper surface. In other words, if the solid-liquid separation in ink given onto a recording medium is slow, it is presumed that ink great in Ka value or ink on paper high in permeability is dispersed isotopically throughout the paper together with coloring materials, thereby resulting in damages on the sharpness of characters (character quality grade) and at the same time coloring materials permeate into the depth of paper, thereby resulting in a decrease of an optical density of image. However, since such a phenomenon cannot be observed in the ink according to this embodiment, solid-liquid separation rapidly occurs in case of given on a recording medium. As a result, an image of high quality can be formed in spite of an increase in a Ka value of ink. Besides, the reason why a phenomenon such as deterioration of character quality grade and lowering of optical density of image hardly takes place with ink according to the present invention even for paper relatively high in permeability is considered to be the same as this. Hereinafter, this point will be described referring to FIGS. 11A to 11C and 12A to 12C.

Figure 11A:
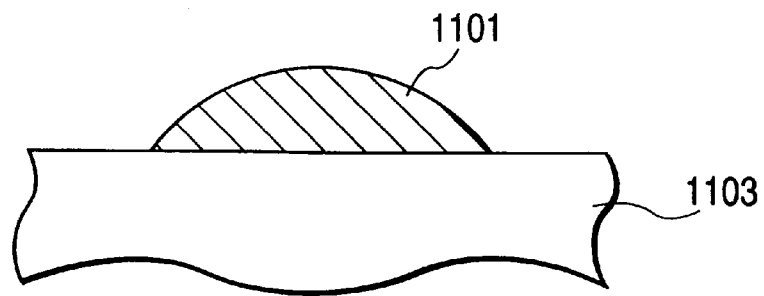
FIGS. 11A, 11B and 11C are drawings illustratively showing a course of solid-liquid separation when a pigment ink comprising a salt is applied to a recording medium.
Figure 11B:
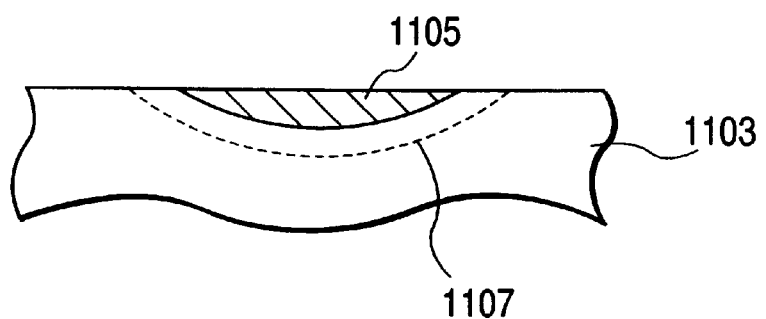
Figure 11C:
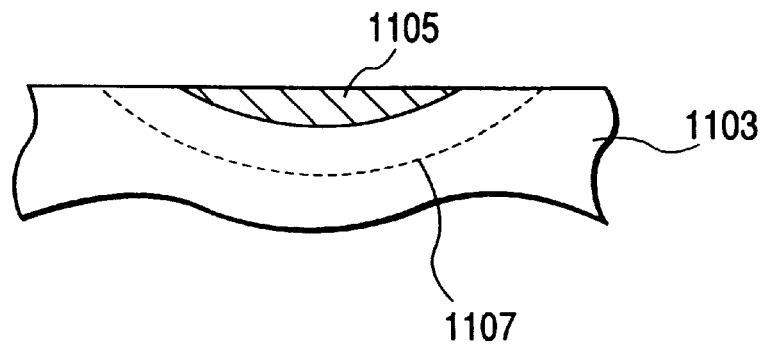
Figure 12A:
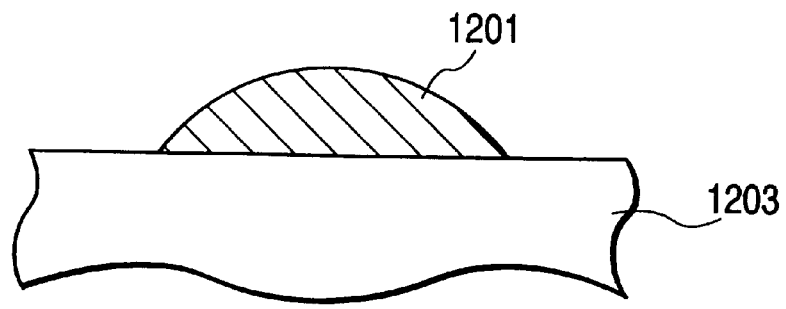
FIGS. 12A, 12B and 12C are drawings illustratively showing a course of solid-liquid separation when a pigment ink comprising no salt is applied to a recording medium.
Figure 12B:
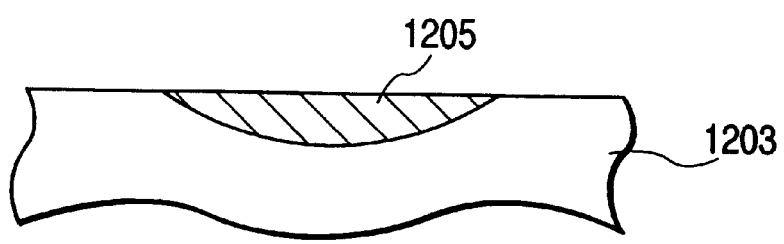
Figure 12C:
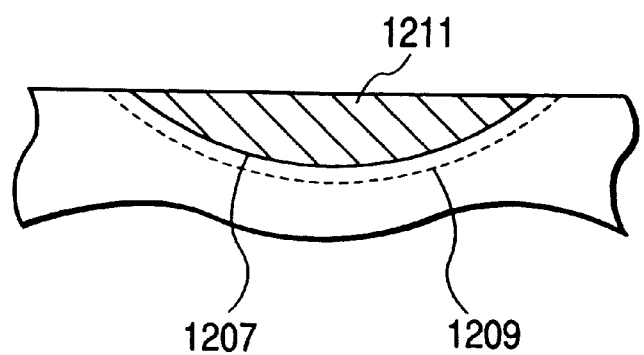

FIGS. 11A to 11C and FIGS. 12A to 12C are illustrations schematically and conceptually showing the manner of a solid-liquid separation occurring in respectively ejecting the salt-contained ink and the salt-free ink from orifices by the ink-jet recording method and giving them to a recording medium high in permeability. Namely, directly after the ink is impacted, a pigment ink 1101 or 1201 is in a status of being placed on a surface of paper 1103 or 1203 regardless of whether with or without addition of salts for both cases of ink as shown in FIG. 11A and FIG. 12A. After the lapse of time T1 for the salt-contained pigment ink, solid-liquid separation occurs rapidly, is almost separated into the area 1105 containing the solid component in abundance from the solvent in ink and the permeation front 1107 of the separated solvent advances to the interior of a solvent paper 1103 as shown in FIG. 11B. On the other hand, because of being not so rapid in solid-liquid separation as with the salt-contained ink, the salt-free pigment ink permeates into the interior of the paper 1203 in an unseparated status 1205 as shown in FIG. 12B. After the lapse of time T2 for the salt-contained ink, the permeation front 1107 of solvent further permeates in the interior but the area 1105 is retained to remain at and near the surface of paper as shown in FIG. 11C. On the other hand, for the salt-free ink, solid-liquid separation just occurs at this point of time, as shown in FIG. 12C, a difference begins to appear between the permeation front 1207 of the solid portion and that 1209 of the solvent, but the solid component contained area 1211 reaches the depth of the recording medium. Incidentally, the time T1 and time T2 in the above description are measures for conceptually understanding a difference of solid-liquid separation between the salt-contained and the salt-free. As clear from the above description, the above effect is presumed to originate in the fact that addition of salts permits solid-liquid separation to occur rapidly, thus resulting in the permeation into the depth of paper as well as the solid-liquid separation at a relatively earlier stage after the impaction of the ink. Namely, addition of salts is considered to make the image grade insusceptible to the degree of permeability in recording medium. And, among the salts mentioned above, sulfates such as, e.g. potassium sulfate and benzoates such as, e.g. ammonium benzoate permit ink-jet record images superior especially in quality to be formed on various recording media probably because of their good affinity to a self dispersible carbon black, specifically excellent solid-liquid separation in case of given to a recording medium.

The content of a self dispersible carbon black in ink is preferably set to the range of from 0.1 to 15% by weight, especially from 1 to 10% by weight relative to the whole weight of ink, while that of salts is preferably set to the range of from 0.05 to 10% by weight, especially from 0.1 to 5% by weight. By setting the contents of a self dispersible carbon black and salts to the respective ranges mentioned above, a still better effect can be enjoyed.

(Self dispersible carbon black)

Next, a self dispersible carbon black will be described in detail.

As a self dispersible carbon black, anionic ones are preferable and carbon black (CB) charged anionically or cationically can be suitably used.

(Anionically charged CB)

As anionically charged carbon black, those of a hydrophilic group, e.g. as shown below combined with the surface of carbon black can be mentioned: —COO(M2), —SO$_3$(M2)$_2$, —PO$_3$H(M2) and —PO$_3$(M2)$_2$.

In the formulae mentioned above, M2 represents a hydrogen atom, an alkali metal, ammonium or an organo-ammonium and R represents a C$_1$–C$_{12}$ alkyl group, a substituted or unsubstituted phenyl group or a substituted or unsubstituted naphthyl group. Among these, especially carbon black anionically charged by combining —COO(M2) or —SO$_3$(M2) with the surface thereof can especially preferably be used for this embodiment because of being good in dispersibility. Meanwhile, among those represented by M2, specific examples of alkali metals include Li, Na, K, Rb, Cs and the like, while specific ones of organo-ammoniums include methyl ammonium, dimethyl ammonium, trimethyl ammonium, ethyl ammonium, diethyl ammonium, triethyl ammonium, methanol ammonium, dimethanol ammonium, trimethanol ammonium and the like. And, ink according to this embodiment comprising a self dispersible carbon black in which M2 is ammonium or organo-ammonium employed can rather promote the water fastness of recorded images and is preferably usable from this point of view. This is attributable to the effect of ammonium decomposed and evaporated when the ink is applied to the surface of a recording medium. Here, the self dispersible carbon black in which M2 is ammonium can be obtained by, for example, a method to substitute ammonium for an alkali metal of a self dispersible carbon black in which M2 is an alkali metal by means of an ion exchange process, a method to make it to a H-type (free acid type) by adding an acid and then adding ammonium hydroxide to make M2 to an ammonium salt, or the like.

Examples of methods for manufacturing anionically charged self dispersible carbon black include a method to perform an oxidation treatment of carbon black with sodium hypochlorite, by which a —COONa group can be chemically bonded to the surface of carbon black.

(Cationically charged Carbon Black)

As cationically charged carbon black, those bonded with at least one selected from the quaternary ammonium groups shown below on the surface of carbon black can be mentioned:

—N$^+$H$_3$, —N$^+$R$_3$, —SO$_2$N$^+$H$_3$, —SO$_2$N$^+$H$_2$COR,

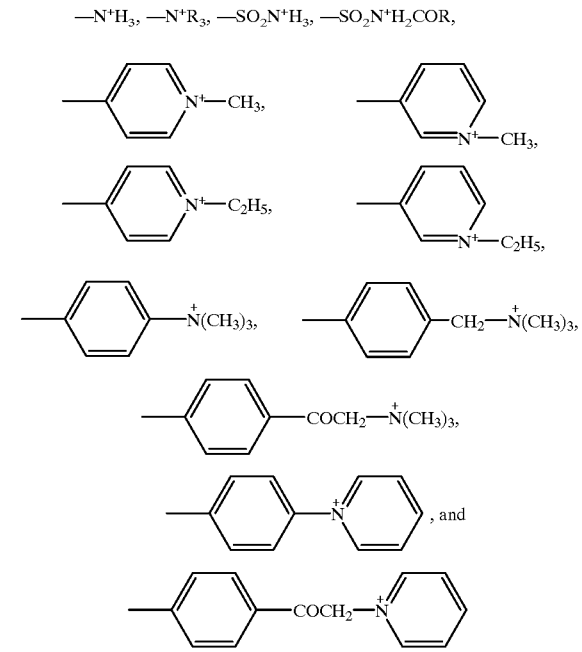

wherein R represents a straight or branched alkyl group having 1 to 12 carbon atoms, a substituted or unsubstituted phenyl group or a substituted or unsubstituted naphthyl group. Aforementioned quaternary ammonium groups have counter anions such as NO$_3^-$, CH$_3$COO$^-$, etc., respectively.

As a method to prepare a cationically charged self dispersible carbon black bonded with a hydrophilic group, there will be explained a method in which an N-ethylpyridyl group

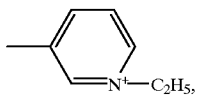

is bonded.

A process to treat carbon black with 3-amino-N-ethyl pyridinium bromide is mentioned. Because of being excellent in water dispersibility due to the repulsion of ions, the carbon black anionically or cationically charged by introducing a hydrophilic group onto the surface thereof retains a stable dispersion state without addition of a dispersant also for its content in ink.

Meanwhile, various hydrophilic groups as mentioned above may be bonded directly to the surface of black carbon, or may be indirectly bonded with another atomic group laid between the surface and the hydrophilic group. Here, specific examples of another atomic groups include a straight or branched alkylene group having 1 to 12 carbon atoms, substituted or unsubstituted phenylene groups and substituted or unsubstituted naphthylene groups. Here, examples of the substituents of the phenylene group and naphthylene group include a straight or branched alkylene group having 1 to 6 carbon atoms. Besides, specific examples of combinations of the another atomic groups and the hydrophilic groups include —$C_2H_4$—COOM, —Ph—$SO_3$M and Ph—COOM, where Ph means a phenyl group and M is an alkaline metal.

Meanwhile, in this embodiment, two or more self dispersible carbon blacks may be appropriately selected from the above types for coloring materials of ink. Besides, the content of a self dispersible carbon black is preferably set to the range of from 0.1 to 15% by weight, in particular from 1 to 10% by weight relative to the whole weight of ink. By choosing this range, a self dispersible carbon black can retain a sufficient dispersion state in ink. Furthermore, in order to adjust the color tone of ink, dyes may be added to ink as coloring materials in addition to the self dispersible carbon black.

(Affinity between a self dispersible carbon black and salts)

In case of using —COO(M2), —$SO_3$(M2)$_2$, —$PO_3$H(M2) or —$PO_3$(M2)$_2$, for example, as hydrophilic group at the surface of a self dispersible carbon black among the above various types of a self dispersible carbon black, a preferable availability of ammonium or organo-ammoniums as M2 is as mentioned above, but bringing M1 into coincidence with M2 is preferable as salts employed at this time. Namely, it has been found out by the present inventors in the course of examining the effect of adding a salt to ink comprising a self dispersible carbon black that the stability of ink is enhanced especially on making M2 (counter ion) identical with M1 in hydrophilic groups. The reason for such an effect obtained by matching M1 with M2 is obscure, but is inferred from a dispersion stability of a self dispersible carbon black retained securely by the absence of salt exchange between the counter ion of the hydrophilic group of a self dispersible carbon black and the salt in ink.

The use of ammonium or organo-ammonium for both M1 and M2 can realize further improvement in water fastness of a recorded image in addition to a stabilization effect on the ink characteristics. When Ph—$COONH_4$ (ammonium benzoate) is then employed as a salt in ink, an excellent result can be obtained in terms of re-ejection characteristics of ink from a head nozzle after suspension of ink jet recording.

(Aqueous medium)

An example of aqueous media used in ink according to this embodiment is water or a mixture comprising water and a water-soluble organic solvent. As water-soluble organic solvent, those being effective in preventing the drying of ink are in particular preferable. Specific examples include $C_1$–$C_4$ alkyl alcohols such as methyl alcohol, ethyl alcohol, n-propyl alcohol, iso-propyl alcohol, n-butyl alcohol, sec-butyl alcohol, and tert-butyl alcohol; amides such as dimethyl formaldehyde and dimethyl acetamide; ketones or ketoalcohols such as acetone and diacetone alcohol; ethers such as tetrahydrofurane and dioxane;

polyalkylene glycols such as polyethylene glycol and polypropylene glycol; alkylene glycols with a $C_2$–$C_6$-alkylene group such as ethylene glycol, propylene glycol, butylene glycol, triethylene glycol, hexylene glycol and diethylene glycol; 1,2,6-hexane triol, thiodiglycol; lower alkyl ether acetates such as polyethylene glycol monomethylether acetate; glycerol; lower alkyl ethers of polyhydric alcohols such as etylene glycol monomethyl-(or monoethyl-)ether, dietylene glycol methyl-(or ethyl-)ether and trietylene glycol monomethyl-(or monoethyl-)ether; polyhydric alcohols such as trimethylol propane and trimethylol ethane; N-methyl-2-pyrrolidene, 2-pyrrolidone and 1,3-dimethyl-2-imidazolidinone. Such water-soluble organic solvents may be used simply or as mixture.

Besides, use of demineralized water is desired.

The content of water-soluble organic solvents in ink according to this embodiment is not especially limited, but lies preferably within the range of from 3 to 50% by weight relative to the whole weight of ink. Besides, the content of water in ink lies preferably within the range of from 50 to 95% by weight.

Figure 13:
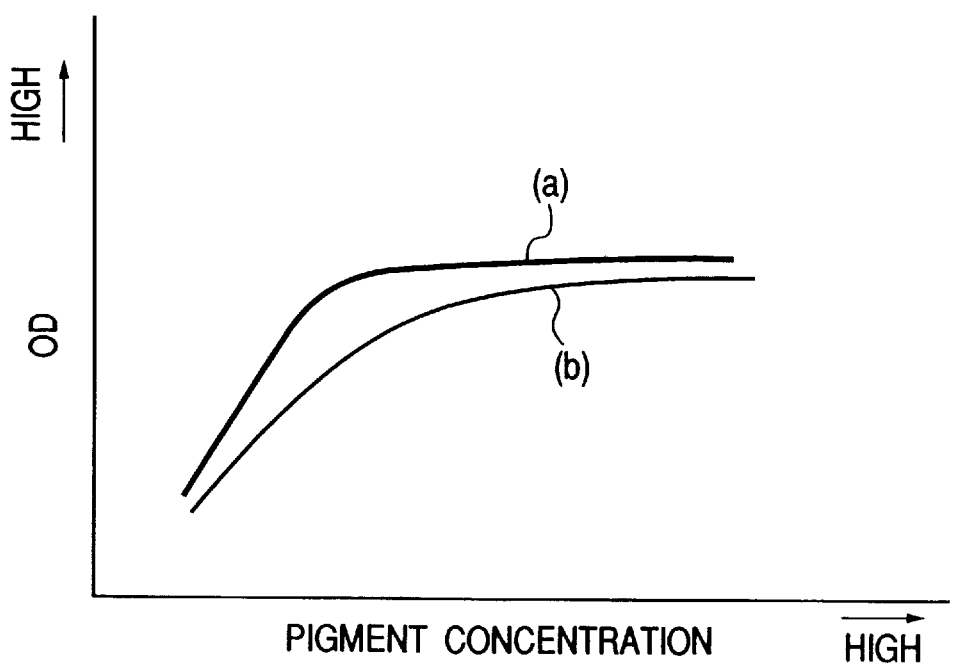
FIG. 13 is a graph showing a relation between a pigment concentration in ink and an optical density of images recorded by an ink comprising a slat and an ink comprising no salt.

As described above, the ink according to the first aspect of the present invention can exhibit a significant effect that the dependence of print quality on recording media's chracteristics can be reduced. In addition, the ink according to the first aspect of the present invention can show further significant technical effect. Namely, as to the ink of the present invention and a reference ink whose contents are identical except that no salt is contained. FIG. 13 shows a relation between the respective inks' pigment concentration and optical density of images formed with the respective inks. As shown in FIG. 13, the optical density of the respective images saturate in the end, and the present inventors have found the fact that the optical density of the image according to the present ink (line (a) of FIG. 13) saturates at lower pigment concentration than the pigment concentration of the reference ink which the optical density of the image according to the reference ink saturates. That is to say, by adding a salt to the ink, the pigment concentration of the ink can be reduced without changing the optical density of the image. For example, when a self dispersible carbon black concentration is varied as to an ink containing 1% by weight of ammonium benzoate, the optical density of the image saturates at about 1.4 when the concentration is set at about 4% by weight, and the optical density does not change any more even if the concentration is incresed. On the contrary, salt-free inks whose concentration of the self dispersible carbon black is set at about 4% by weight and 7% by weight provide prints having optical densities of about 1.32 and 1.35, respectively. Further, even though the concentration is set at about 8% by weight, the optical density keeps the value of about 1.35. Therefore, for the salt-free ink, the saturated value of the optical density is considered to be 1.35. The difference between the saturated values in optical density is numerically slight as 0.05 which is a difference between 1.40 and 1.35, but the difference between the images is conspicuous.

As stated above, the salt added inks of the present invention can provide a print having a high optical density at relatively low carbon black concentration in comparison with the salt-free inks, and also the saturated value in an optical density of the image according to the present ink is higher than that according to the salt-free inks. Thus, the present ink brings favorable and unexpected effects in ink-jet printing.

This also provides the following advantage. That is, ink comprising a salt has such characteristics that it has a wide margin for carbon black concentrations with respect to optical density of printing, as mentioned above. Thus, when an ink tank containing an absorbent is filled with this ink, left in the same posture over a long period of time (for example, it is left to keep its nozzle on the upside for 6 months), and then employed for printing, it can be prevented very effectively to cause a visually-detectable difference in optical density between printings obtained in the initial phase of printing and those obtained immediately before the ink in the ink tank is used up.

As a still another effect of addition of salts in ink according to this embodiment, the excellence in intermittent ejection property is mentioned. The intermittent ejection property means estimation of whether ink is normally ejected or not with eyes laid to a definite nozzle of the recording head when ink is again ejected from the nozzle on standing for a predetermined time without spare ejecting or sucking the ink remaining in the nozzle after ejecting ink from the nozzle.

Second Embodiment

As a second embodiment according to the present invention, for example, an embodiment with a stabilizer further added to the ink described above as the first embodiment can be mentioned. Here, as stabilizer, a surfactant can be mentioned, for example. Besides, as surfactant, one selected from anionic, nonionic and cationic surfactants can be employed. And, if the content of stabilizers in ink is set to 0.005 to 0.4% by weight, in particular to 0.02 to 0.2% by weight, and more particularly 0.02 to 0.1% by weight, relative to the whole weight of ink, the preservation stability of ink can be further promoted and moreover the ejecting characteristics or the like of ink is hardly affected. Furthermore, application of this technique hardly affects the effect obtained in ink according to the first embodiment, especially by making M1 and M2 into an identical group, e.g. ammonium.

(Anionic surfactant)

Examples of anionic surfactants include higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefine sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates and the like.

(Cationic surfactants)

Examples of cationic surfactants include aliphatic amines, quaternary ammonium salts, sulfonium salts, phosphonium salts and the like.

(Nonionic surfactants)

Examples of nonionic surfactants include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. Even among the various surfactant mentioned above, those with ionic groups are preferably used. Besides, among these surfactants, it is preferable to use anionic or nonionic surfactans for the carbon having an anionic hydrophilic group on the surface, or cationic or nonionic surfactants for the carbon having a cationic hydrophilic group.

(Dodecylbenzenesulfonate)

Figure 10:
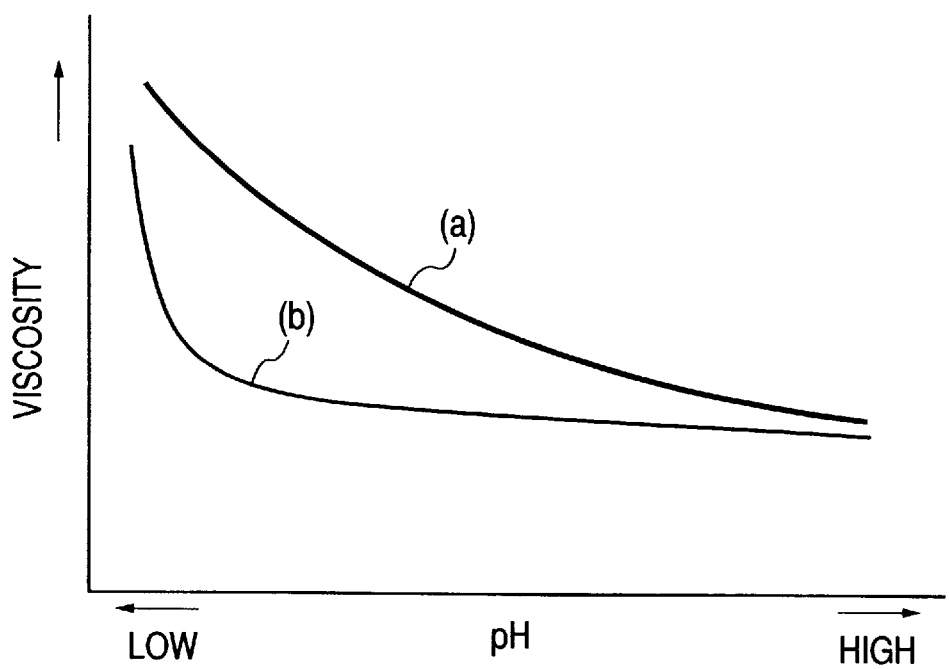
FIG. 10 is a graph roughly illustrating a relation between a viscosity and a pH of the ink according to an embodiment of the present invention.

Meanwhile, a change in ink characteristics accompanying the pH change of ink can be made astonishingly slow, surprisingly in this embodiment, when a dodecylbenzenesulfonate (sodium salt, potassium salt, ammonium salt or the like) as a surfactant is added to an ink comprising a self dispersible carbon black charged anionically by introducing a hydrophilic group such as $-COO(M2)$, $-SO_3(M2)$, $-PO_3H(M2)$ and $-PO_3(M2)_2$, where M2 in the formulae represents a hydrogen atom, alkali metal, ammonium or an organo-ammonium and R represents a $C_1-C_{12}$ alkyl group, a substituted or unsubstituted phenyl group or a substituted or unsubstituted naphthyl group, directly or indirectly on the surface and further a salt concurrently. Namely, the line (a) in FIG. 10 shows an outline of a pH change depending on a viscosity change of an ink comprising an anionically charged self dispersible carbon black and a salt in coexistence, included in the first embodiment. Like this, ink according to the first embodiment tends to change somewhat greatly in ink characteristics with a pH change. However, addition of a dedocylbenzenesulfonate to such ink can mitigate a change of ink characteristics for a pH change extremely as shown in the line (b) of FIG. 10. Here, the content of a dodecylbenzenesulfonate in ink is preferably 0.02 to 0.2% by weight relative to the whole weight of ink.

Third Embodiment

Next, as a third embodiment of the present invention, ink prepared from ink according to the first or second embodiment by setting the pH to 9 to 12, in particular to 9 to 11, can be mentioned. As mentioned above, the inventors have been aware of that the pH dependence of ink characteristics is rather great and a pH value tends to lower with a longer period of preservation for the ink according to the first embodiment of the present invention. If the pH of ink lies within the above range, however, a change with time in characteristics of ink is on an almost negligible order.

Unless otherwise adjusted, the pH of the ink described in the first or second embodiment is normally on the order of 7 to 8. Such the pH value of ink can be adjusted to a desired one, e.g. by using an hydroxide, such as specifically potassium hydroxide, aqueous ammonia solution or lithium hydroxide. Meanwhile, when ink was preserved for a long period of time, the pH changes by the order of 1, specifically lowers in some cases depending on a composition and preserving conditions. In order to retain such a pH value in ink after the long-term preservation within the above range, it is preferable to adjust the initial pH to a somewhat higher value within the range of from 9 to 12 beforehand.

Here, the ink with the pH of ink according to the second embodiment, i.e. ink comprising a dodecylbenzenesulfonate as stabilizer, adjusted to within the above range can be appropriately used in particular as ink for ink-jet recording. This is because, due to the effect of mitigating the pH dependence of ink characteristics for ink obtained by the content of a dodecylbenzenesulfonate, variations in ink characteristics reduces more and more within the above pH range. Besides, since the amount of a dodecylbenzenesulfonate is added only to extent sufficient for suppressing the variation in ink characteristics in the above pH range, the effect of minimizing the addition of a dodecylbenzenesulfonate is also displayed.

Fourth Embodiment

As ink according to a fourth embodiment of the present invention, ink with an antioxidant added to ink according to any of the first to the third embodiments can be mentioned. Such addition of an antioxidant can improve the preserving stability of ink still more.

Examples of antioxidants may include sodium sulfite, sodium hydrogensulfite, ascorbic acid, gallic acid, 2-naphthol tannic acid, catechol, o-phenylene diamine and succinic acid and it is advisable to add one or more compounds selected from these to ink.

Although the action of these compounds added to ink is obscure, the progress of oxidation with time, for example, in water-soluble solvent such as, e.g. ethylene glycol is considered to affect the disperse state of pigments and the above compounds can effectively prevent the oxidation of the above solvents, so that the long-period preservability of ink is presumed to be stabilized.

Here, if the addition of an antioxidant is set to 0.02 to 10% by weight, in particular 0.1 to 2% by weight relative to the whole weight of ink, promotion the preserving stability is achievable with hardly any change in ink characteristics.

Fifth Embodiment

As ink according to a fifth embodiment of the present invention, ink with a water-soluble polymer compound added to ink according to any one of the first to the fourth embodiments can be mentioned. Such addition of a water-soluble polymer compound can improve the frictional resistance of an image after the recording of the image by depositing this ink to the surface of a recording medium.
(Water-soluble polymer compounds)

Examples of water-soluble polymer compounds include styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives.

And, a weight average molecular weight of a water-soluble polymer compound used here is set preferably to the order of 1,000 to 5,000, for example, and the content of a water-soluble polymer compound is set preferably to 0.02 to 2% by weight, in particular to 0.05 to 1% by weight, and more particularly 0.1 to 1% by weight, to the whole weight of ink. Namely, if the molecular weight and the content in ink are set to such respective ranges, a variation of ink viscosity or ink ejecting characteristics with the addition of a water-soluble polymer compound can be minimized to substantially negligible extent while the advantages (such as improvement of the frictional resistance of a recorded image) of the added water-soluble polymer compound is secured.
(Ink characteristics: ink-jet ejecting characteristics and permeability through recording media)

Ink according to each of the embodiments mentioned above can be used as ink for writing tools and ink for ink-jet recording. As ink-jet recording methods, there are a recording method in which a mechanical energy is applied to ink to eject liquid droplets and a recording method in which a thermal energy is applied to ink to eject liquid droplets under action of bubbles of an ink, for both of which ink according to the present invention is especially suitable. When using the ink according to each of the embodiments for ink-jet recording, it is preferable for the ink to have a characteristic capable of being ejected from an ink-jet head. From the viewpoint of ejection property from an ink-jet head, a viscosity and a surface tension, for example, are set preferably to 1 to 15 cP and 25 dyn/cm or stronger, in particular to 1 to 5 cP and 25 to 50 dyn/cm, respectively, as characteristics of the liquid.

Besides, as an index indicating a permeability of ink to a recording medium, there is a Ka value determined by the Bristow method. Namely, the permeating amount V (ml/m$^2$=$\mu$m) of ink to a recording medium after the lapse of a predetermined time t from the an ink droplet is ejected is expressed in terms of the Bristow formula:

$$V=Vr+Ka(t-tw)^{1/2},$$

supposing that the permeability of ink is expressed by an ink amount V per m$^2$, tw is a contact time and Vr is an amount of ink absorbed.

Here, directly after the depositing of an ink droplet to the surface of a recording medium, almost all ink is absorbed in the uneven portion (rough portion on a surface of recording medium) of the recording medium surface and almost none permeates into the recording medium interior. The duration time is a contact time (tw) and the amount of ink absorbed in the uneven portion of a recording medium during the contact time is Vr. Then, when the contact time elapsed after the depositing of ink, the amount of ink permeating through a recording medium increases in proportion to ½ power of the elapsed time exceeding the contact time, i.e., (t−tw). A Ka value is a proportional coefficient of this increment and represents a value corresponding to the permeating speed. And, the Ka value is measurable by using a dynamic permeability testing device (such as Dynamic Permeability Testing Device S, trade name, a product of TOYO Seiki Mfg., Ltd.) for a liquid by the Bristow method. Furthermore, in ink according to each of the embodiment mentioned above, setting this Ka value to not more than 1.5 is preferable for further promoting the quality of a recorded image, more preferably a Ka value of from 0.2 to 1.5. With ink comprising a self dispersible carbon black and a salt, for example, according to the first embodiment, the solid-liquid separation is accelerated on a recording medium, greatly contributing to the promotion of image quality as mentioned above. For a Ka value of not more than 1.5, since the solid-liquid separation takes place at an earlier stage of the permeating process of ink through a recording medium, a high quality image with very few feathering seems capable of being formed on various recording media under cooperation with the addition of a salt to ink. Incidentally, the Ka value by the Bristow method in the present invention is measured on plain paper (such as PB paper available from Canon Inc. and serving for copiers or page printers (laser beam printers) using the electronic photography process or for ink-jet printers using the ink-jet recording process and PPC paper serving for copiers using the electronic photography process) employed as a recording medium. Besides, as measuring environments, general office environments such as temperature of from 20 to 25° C. and humidity of from 40 to 60% are assumed.

And, as composition of aqueous medium allowing ink according to each of the embodiments mentioned above to carry the above characteristics, those comprising glycerol, trimethylol propane, thiodiglycol, ethylene glycol, diethylene glycol, isopropyl alcohol and acetylene alcohols are preferable. Incidentally, as one example of acetylene alcohol, the one expressed in terms of the chemical formula mentioned below can be mentioned:

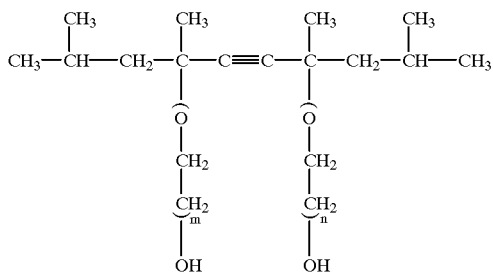

where n+m is 10.

In particular, for a Ka value set to not more than 1.5 as mentioned above, the desired ink can be attained by appropriately adding a surfactant such as acetylenol, a permeative solvent or the like at a predetermined amount.

Furthermore, in addition to the above components, surfactants, defoaming agents, antiseptics, antimolds, etc. can be added to make ink having desired property values if necessary and further commercially available water-soluble dyes may be added.

(Ink-jet recording technology)

An ink-jet recording technology in which the above-described inks can be suitably used will hereinafter be described.

Figure 2:
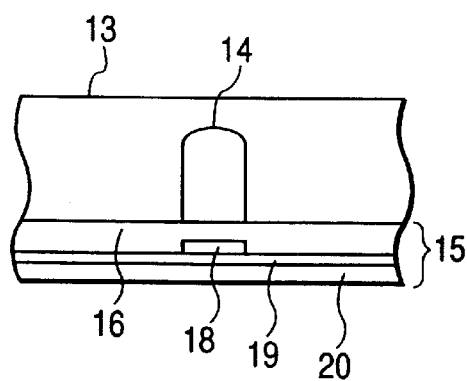
FIG. 2 is a transverse cross-sectional view taken along line 2—2 in FIG. 1.

Examples of a head construction, which is a main component of an ink-jet recording apparatus of a system that thermal energy is used to eject an ink will be shown in FIGS. 1 and 2.

FIG. 1 is a schematic cross-sectional view of a head 13 taken along an ink flow path, and FIG. 2 is a cross-sectional view taken along line 2—2 in FIG. 1. In FIGS. 1 and 2, the head 13 is formed by bonding a glass, ceramic, silicon or plastic plate or the like having a flow path (nozzle) 14, through which an ink is passed, to a heating element substrate 15. The heating element substrate 15 is composed of a protective film 16 made of silicon oxide, silicone nitride, silicon carbide or the like, aluminum electrodes 17-1 and 17-2 made of aluminum, aluminum-copper alloy or the like, a heating resistor layer 18 made of a high-melting point material such as $HfB_2$, TaN, TaAl and the like, a heat accumulating layer 19 made of thermally oxidized silicon, aluminum oxide or the like, and a substrate 20 made of silicone, aluminum, alumina nitride or the like having a good heat radiating property.

Now, upon application of electric signals to the electrodes 17-1 and 17-2 in a form of a pulse, the heating element substrate 15 rapidly generates heat at the region shown by "n" to form bubbles in the ink 21 which is in contact with this region. The meniscus 23 of the ink is projected by the pressure thus produced, and the ink 21 is ejected from the orifice 22 to a recording medium (for example, paper) 25 in the form of minute droplets 24 and applied to a recording medium 25.

Figure 3:
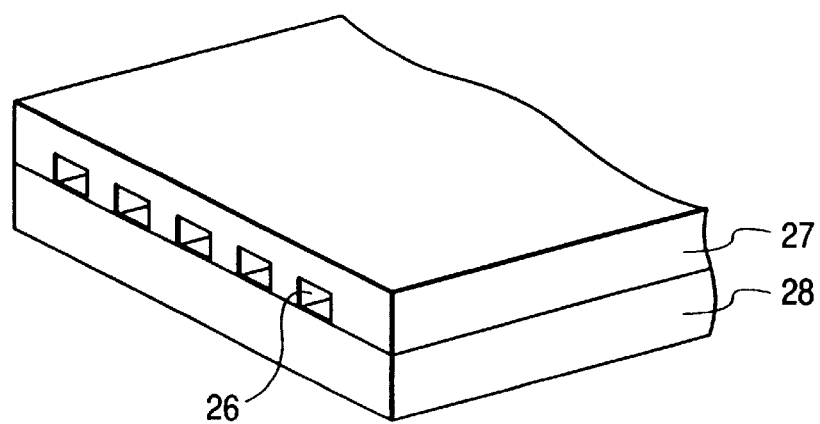
FIG. 3 schematically illustrates a multi-head.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

(Ink-jet recording apparatus)

Figure 4:
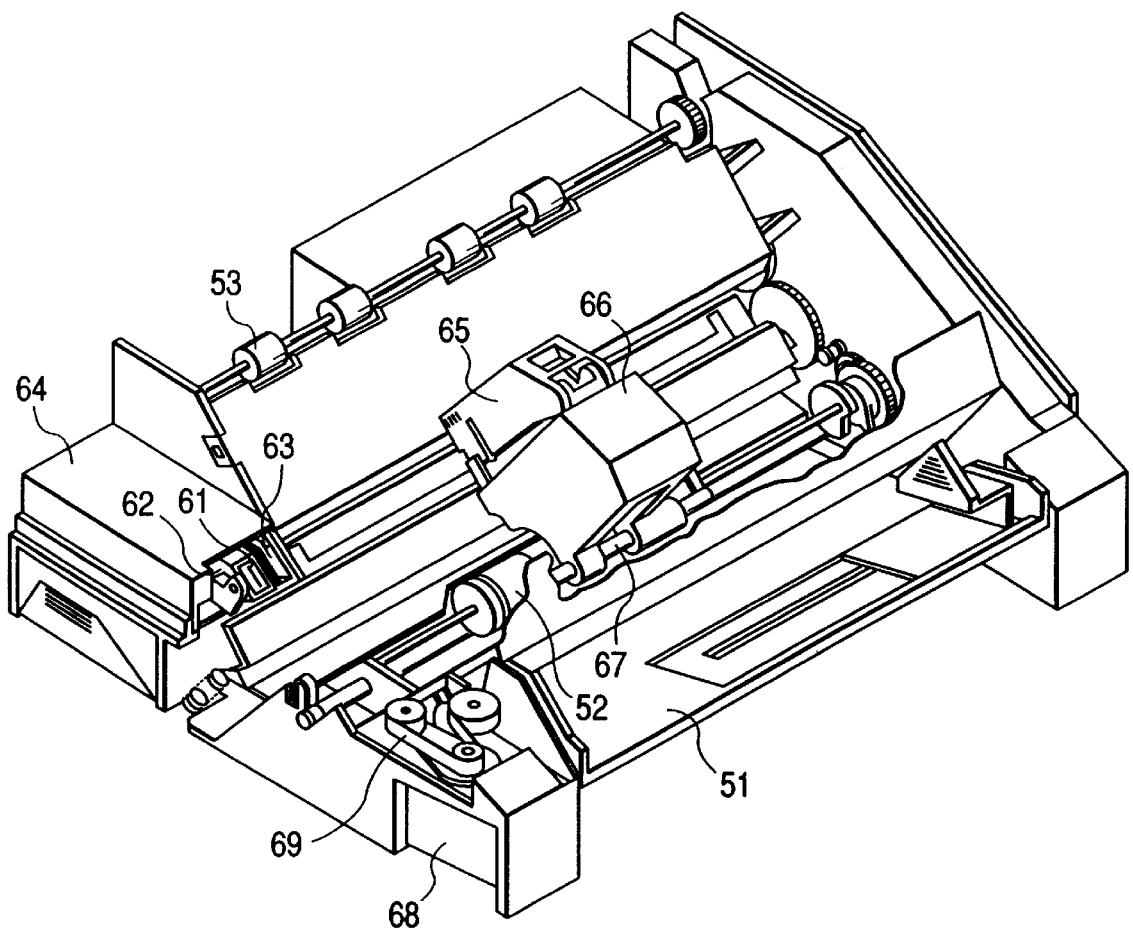
FIG. 4 is a schematic perspective view illustrating an ink-jet recording apparatus according to an embodiment of the present invention.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap which is provided at a home position adjacent to the blade 61, and is so constructed that it moves in a direction perpendicular to a direction in which the recording head 65 is moved, and comes into contact with the face of ejection openings to cap it. Reference numeral 63 denotes an absorbing member provided adjoiningly to the blade 61 and, similar to the blade 61, held in such a form that it protrudes into the course through which the recording head 65 is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto. Reference numerals 51 and 52 denote a paper feeding part from which the recording paper is inserted, and paper feed rollers driven by a motor (not illustrated), respectively.

With such a construction, the recording paper is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

(Ink cartridge)

Figure 5:
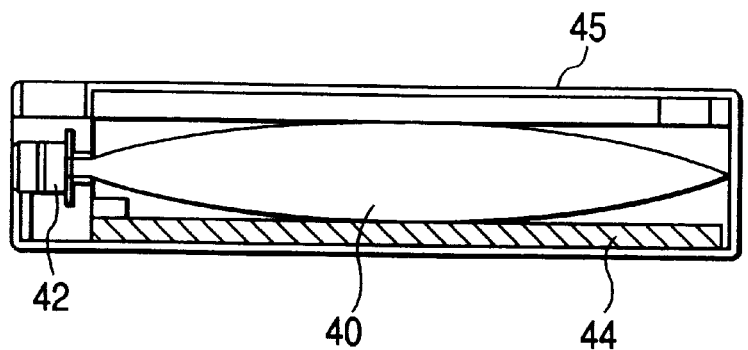
FIG. 5 is a longitudinal cross-sectional view of an ink cartridge according to an embodiment.

FIG. 5 illustrates an exemplary ink cartridge 45 in which an ink to be fed to a head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an absorbing member for receiving a waste ink. It is preferred that the ink container portion be formed of a polyolefin, in particular, polyethylene, at its surface with which the ink comes into contact.

(Recording unit)

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
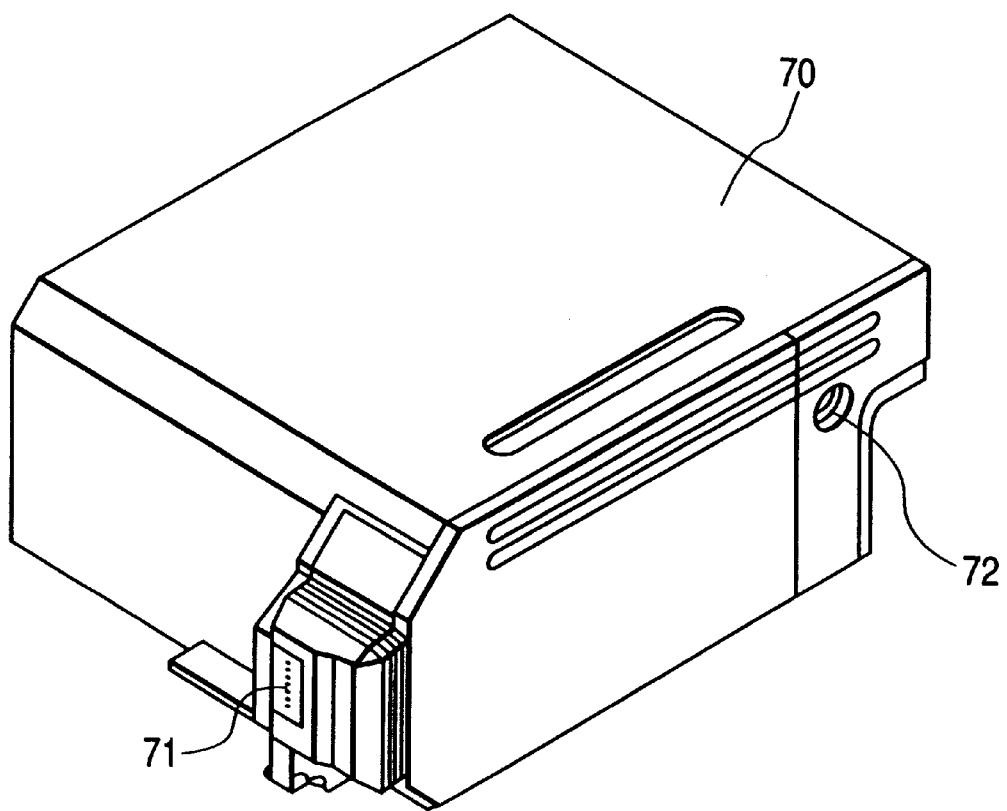
FIG. 6 is a perspective view illustrating an ink-jet recording unit according to an embodiment.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane is preferably used as a material for the ink-absorbing member.

Alternatively, the ink container portion may be so constituted that it is an ink bag mounted with a spring and the like, without using the ink absorbing member. Reference numeral 72 indicates an air passage for communicating the interior of the recording unit 70 with the atmosphere. This recording unit 70 can be used in place of the recording head 65 shown in FIG. 4, and is detachably installed on the carriage 66.

Next, as a second embodiment of an ink-jet recording apparatus utilizing mechanical energy, there may be exemplified an On-Demand ink-jet recording head, which is provided with a nozzle-formed substrate having a plurality of nozzles, a pressure-generating element composed of a piezo-electric material and a electric conductive material positioned opposing to the nozzles and an ink which fills the surrounding of the pressure-generating element, and which can eject ink-droplets from the nozzles, by deforming the pressure-generating element upon a voltage-application. An example of a construction of the head which constitutes a recording apparatus is shown in FIG. 7.

The head is constituted with the ink flow path 80 communicated with an ink chamber (not shown), an orifice plate 81 for ejecting an ink droplet of a desired volume, a vibration plate 82 which serves to apply directly a pressure to the ink, a piezo electric element 83 which deforms by an electric signal and is connected with the vibration plate and a substrate 84 for supporting and fixing the vibration plate and the like.

Figure 7:
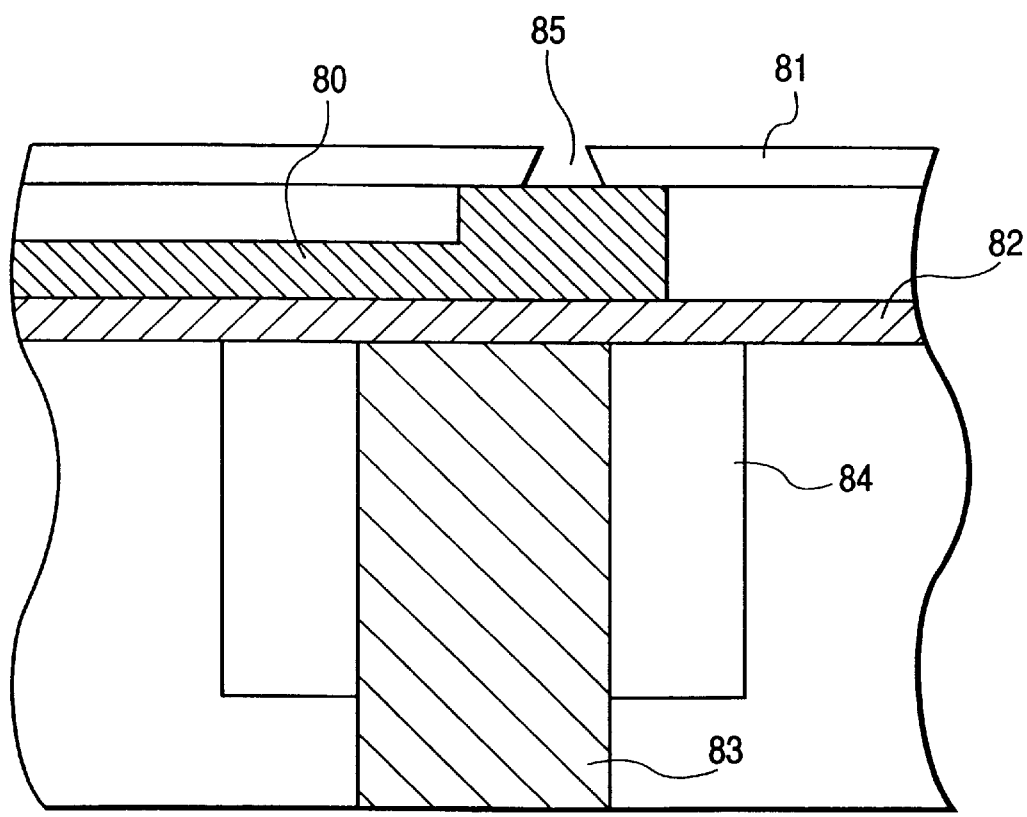
FIG. 7 is a schematic perspective view illustrating another exemplary construction of an ink-jet recording head.

In FIG. 7, the ink flow path 80 is made of a photosensitive resin and the like, the orifice plate 81 is made of a metal such as stainless steel, nickel and the like and an ejection opening 85 is formed thereon by punching the plate by means of electrocasting or press processing, the vibration plate 82 is formed from a metal film such as stainless steel, nickel, titanium and the like, or from a elastic resin film or the like and the piezo electric element 83 is made of a ferroelectric material such as barium titanate, PZT and the like. The recording head thus constituted operates so as to provide a voltage to the piezo electric element 83 in a form of pulse, to generate a strain stress, to deform the vibration plate connected with the piezo electric element 83 by the stress, and to press the ink in the ink flow path 80 perpendicularly to eject ink droplets (not shown) from the orifice 85 of the orifice plate 81, thereby conducing recording. Such the recording head can be used upon mounted in the same recording apparatus as shown in FIG. 4.

(Ink set)

Meanwhile, ink according to each of the first to the fifth embodiments mentioned constitutes a black ink. This ink can provide an ink set appropriately used for the formation of a color image by its combination with at least one color ink selected from the group consisting of a color ink comprising a coloring material for yellow, a color ink comprising a coloring material for magenta, a color ink comprising a coloring material for cyan, a color ink comprising a coloring material for red, a color ink comprising a coloring material for blue and a color ink comprising a coloring material for green. And, when such an ink set is used to make a record in which the black image portion and the color image portion are adjacent with each other, the occurrence of bleeding can be very effectively eliminated. Incidentally, the reason for such an ink set to very effectively eliminate the occurrence of bleeding is obscure, but is attributable to the effect of a rapid progress of solid-liquid separation and a subsequent solidification of the colorant after the depositing of the black ink to a recording medium by making black ink coexistent with a self dispersible carbon black and a salt, thus leading to a difficulty in exudation of black ink to the side of color ink at the boundary of color image portion.

(Color ink)

Here, as coloring materials of color ink usable for the above ink set, publicly-known dyes or pigments can be employed. Examples of usable dyes include acid dyes and direct dyes. As anionic dyes, for example, most of the existing or newly synthesized ones are usable only if moderate in color tone and density. Besides, any mixture of these is also usable. Specific examples of anionic dyes will be mentioned below.

(Yellow coloring materials)
  C.I. Direct Yellow 8, 11, 12, 27, 28, 33, 39, 44, 50, 58, 85, 86, 87, 88, 89, 98, 100 and 110;
  C.I. Acid Yellow 1, 3, 7, 11, 17, 23, 25, 29, 36, 38, 40, 42, 44, 76, 98 and 99;
  C.I. Reactive Yellow 2, 3, 17, 25, 37 and 42; and
  C.I. Food Yellow 3

(Red coloring materials)
  C.I. Direct Red 2, 4, 9, 11, 20, 23, 24, 31, 39, 46, 62, 75, 79, 80, 83, 89, 95, 197, 201, 218, 220, 224, 225, 226, 227, 228 and 229;
  C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;
  C.I. Reactive Red 7, 12, 13, 15, 17, 20, 23, 24, 31, 42, 45, 46 and 59; and
  C.I. Food Red 87, 92 and 94.

(Blue coloring materials)
  C.I. Direct Blue 1, 15, 22, 25, 41, 76, 77, 80, 86, 90, 98, 106, 108, 120, 158, 163, 168, 199 and 226;

C.I. Acid Blue 1, 7, 9, 15, 22, 23, 25, 29, 40, 43, 59, 62, 74, 78, 80, 90, 100, 102, 104, 117, 127, 138, 158 and 161; and C.I. Reactive Blue 4, 5, 7, 13, 14, 15, 18, 19, 21, 26, 27, 29, 32, 38, 40, 44 and 100.

(Black coloring materials)

C.I. Acid Black 2, 4, 8, 51, 52, 110, 115 and 156; and

C.I. Food Black 1 and 2.

(Solvent)

As a solvent or dispersion medium of ink comprising coloring materials for color ink as mentioned above, water or a solvent mixture of water and a water-soluble organic solvent, for example, is mentioned. And, as a water-soluble organic solvent, the same ones as described in the first embodiment are mentioned. Besides, in case of depositing the color ink to a recording medium by the ink-jet method (such as bubble jet method), ink is preferably prepared so as to have a desired viscosity and surface tension, leading to excellency in ink-jet ejecting characteristics.

(Contents of coloring materials)

Here, the content of coloring materials in each color ink needs to be appropriately selected only so as to be excellent in ink ejecting characteristics and to have a desired color tone and density, for example, in use for ink-jet recording, but lies preferably in the range of, e.g. from 3 to 50% by weight relative to the whole weight of ink as a standard. On the other hand, the water content in ink lies preferably in the range of from 50 to 95% by weight relative to the whole weight of ink.

(Permeability of color ink)

With respect to color ink as mentioned above, setting the Ka value of ink, for example, to 5 or more, enabling a high quality color image to be formed on a recording medium, is preferable. Namely, even in case of recording images of at least two colors selected, e.g. from yellow, magenta and cyan, adjacently, ink having such a Ka value can eliminate the bleeding between the adjacent images on account of its high permeability through a recording medium. Even if these colors of ink are printed in overlapping to form an image of secondary color, the bleeding between the adjacent images of different colors can be eliminated because individual colors of ink are highly permeable. To the preparation of color ink in such a value of Ka, a former publicly-known method, such as, e.g. addition of a surfactant or addition of a permeative solvent such as glycol ether, is applicable and needless to say, the added amount needs only to be chosen appropriately.

(Recording apparatus and recording method using the ink set)

Figure 8:
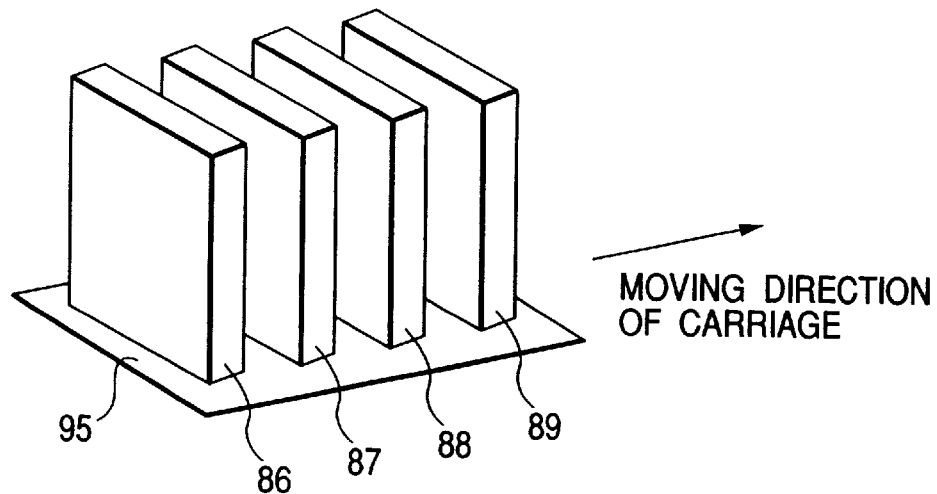
FIG. 8 schematically illustrates a recording head in which 4 ink cartridges are installed.
Figure 9:
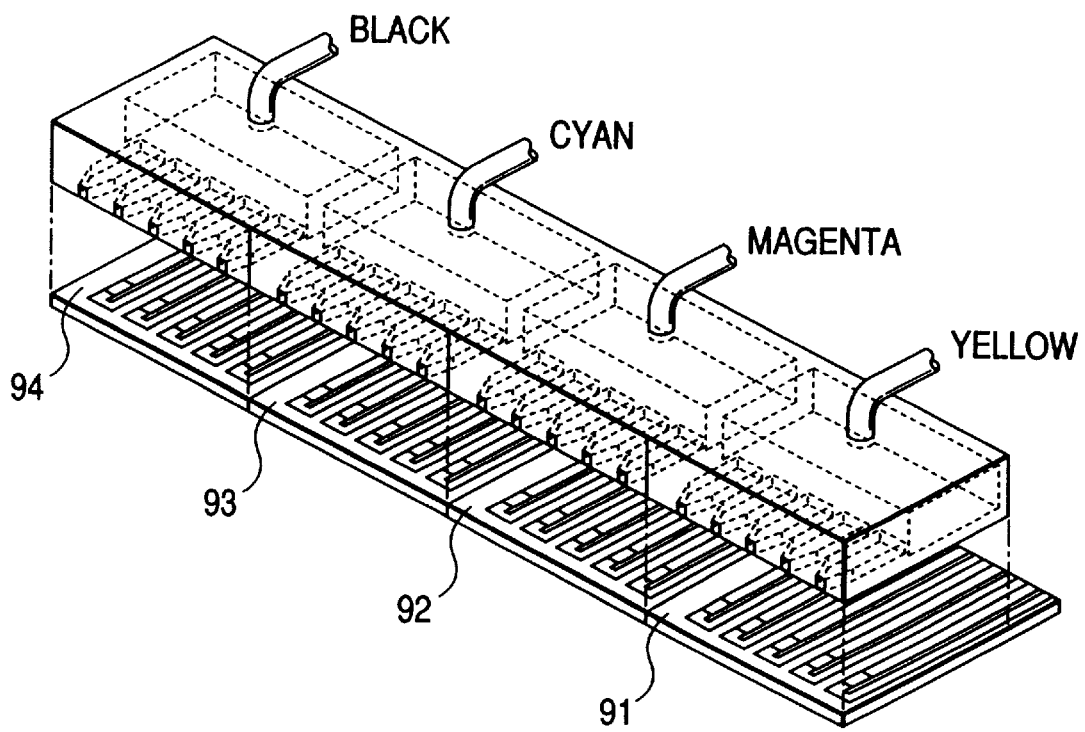
FIG. 9 schematically illustrates the construction that 4 recording heads are arranged on a carriage.

In use of the above ink set for recording a color image, a recording apparatus with four recording heads lined up on a carriage, e.g as shown in FIG. 3, can be used. FIG. 9 shows one embodiment thereof, in which recording units 91, 92, 93 and 94 are provided respectively for ejecting yellow, magenta, cyan and black ink, for example. The recording units are disposed on the carriage in the above recording apparatus and jet individual colors of ink in response to recording signals. Besides, FIG. 9 shows an example of using four recording units, but the present invention is not limited to this and an embodiment comprising a single recording head 95 with the flow path so divided as to allow the four respective colors of ink, supplied from ink cartridges 86 to 89 each containing the four colors of ink on one recording head, to be individually ejected for recording, for example, as shown in FIG. 8 is also mentioned.

Hereinafter, referring to Examples and Comparative Examples, the present invention will be described still more specifically but is not limited by the Examples mentioned later without departing from its essential points. Incidentally, in the following description, a designation of "part" and "%" is based on the weight unless otherwise specified.

EXPERIMENTAL EXAMPLE I-(1)

Evaluation of the Ink According to the First Embodiment

First of all, Pigment dispersions 1 to 4 were prepared.

Pigment Dispersion 1:

After fully mixing 10 g of carbon black having a surface area of 230 $m^2$/g and DBP oil absorption of 70 ml/100 g and 3.41 g of p-amino-benzoic acid with 72 g of water, 1.62 g of nitric acid was added drop by drop to the mixture with stirring at 70° C. Here, several seconds later, a solution of 1.07 g of sodium nitrite dissolved in 5 g of water was add with further stirring for 1 hour. The obtained slurry was filtered through filter paper, TOYO Filter Paper No. 2 (trade name, a product of Advantis Co.), and the pigment particles filtered out were fully washed with water and dried on a 90° C. oven. Further water was added to this pigment to prepare a 10% by weight aqueous dispersion of pigment. By the above method, the group expressed in terms of the chemical formula:

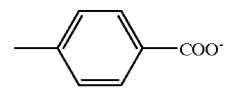

was introduced to the surface of carbon black.

Pigment Dispersion 2:

At 5° C., 1.58 g of anthranilic acid was added to a solution of 5 g of concentrated hydrochloric acid dissolved in 5.3 g of water. To this, while keeping a temperature of not higher than 10° C. with stirring in an ice bath, a solution of 1.78 g of sodium nitrite dissolved in 8.7 g of water was added at 5° C. To this, after further stirring for 15 minutes, 20 g of carbon black having a surface area of 320 $m^2$/g and DBP oil absorption of 120 ml/100 g was added in a state of mixture and stirred further for 15 minutes. The obtained slurry was filtered through filter paper, TOYO Filter Paper No. 2 (trade name, a product of Advantis Co.), and the pigment particles filtered out were fully washed with water and dried on a 110° C. oven. Further water was added to this pigment to prepare a 10% by weight aqueous dispersion of pigment. By the above method, the group expressed in the term of chemical formula:

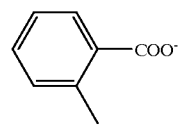

was introduced to the surface of carbon black.

Pigment Dispersion 3:

To the Pigment dispersion 2 prepared above, sulfuric acid was added so as to bring the pH to the order of 4.5 and the carboxyl group bonded to the surface of carbon black was made into H type. Thereafter, the mixture was centrifuged at 5,000 rpm for 5 minutes, the precipitate was taken out and again dispersed into pure water. By repeating this centrifugal treatment three times, carbon was washed with water. Furthermore, the pH of this disperse solution was adjusted to the order of 8 by the addition of $NH_4OH$. By these treatments, the counter ion of a carboxyl group bonded to the carbon surface was converted from $Na^+$ into $NH_4^+$. And, the Pigment dispersion containing such a self dispersible carbon black was made to Pigment dispersion 3.

Pigment Dispersion 4:

Carbon black with —COONa groups introduced to the surface by the following method was prepared.

After 300 g of acidic carbon black MA-77 (pH 3.0) (trade name, a product of Mitsubishi Chemical Industries Ltd.) fully mixed with 1,000 ml of water, 450 g of sodium hypochlorite solution (effective chlorine concentration 12%) was added drop by drop to this mixture, and stirred at 100 to 105° C. for 10 hour. The obtained slurry was filtered through filter paper, TOYO Filter Paper No. 2 (trade name, a product of Advantis Co.), and the pigment particles filtered out were fully washed with water. Wet cake of this pigment was again dispersed into 3,000 ml of water and desalted with a reverse osmosis membrane to an electric conductivity of 0.2 μs. Furthermore, this Pigment dispersion (pH 8 to 10) was concentrated to a pigment concentration of 10% by weight to obtain carbon black on the surface of which a —COONa group was introduced.

Next, Black Inks 1 to 4 were prepared by employing aftermentioned Pigment dispersions 1 to 4, as follows.

(Black Ink 1)

After the following components were mixed and dissolved fully with stirring, the solution was filtered through a micro filer having a pore size of 3 μm (available from Fuji Photo Film Co., Ltd) under pressure to prepare Black Ink 1.

| | |
|---|---|
| Pigment dispersion 1: | 30 parts |
| potassium sulfate: | 1 part |
| trimethylol propane: | 6 parts |
| glycerol: | 6 parts |
| diethylene glycol: | 6 parts |
| acetylene glycol ethyleneoxide adduct (ACETYLENOL EH, trade name, a product of KAWAKEN Fine Chemical, Ltd.): | 0.2 part |
| water: | 50.8 parts |

(Black Ink 2)

Using the following components, Black Ink 2 was prepared in the same manner as in the Black Ink 1.

| | |
|---|---|
| Pigment dispersion 2: | 30 parts |
| potassium chlorite: | 0.5 part |
| trimethylol propane: | 6 parts |
| acetylene glycol ethyleneoxide adduct (ACETYLENOL EH, trade name, a product of KAWAKEN Fine Chemical, Ltd.): | 0.15 part |
| glycerol: | 5 parts |
| ethylene glycol: | 5 parts |
| water: | 53.35 parts |

(Black Ink 3)

Using the following components, Black Ink 3 was prepared in the same manner as in the Black Ink 1.

| | |
|---|---|
| Pigment dispersion 3: | 30 parts |
| ammonium benzoate: | 1 part |
| trimethylol propane: | 6 parts |
| acetylene glycol ethyleneoxide adduct (ACETYLENOL EH, trade name, a product of KAWAKEN Fine Chemical, Ltd.): | 0.15 part |

-continued

| | |
|---|---|
| glycerol: | 5 parts |
| diethylene glycol: | 5 parts |
| water: | 52.85 parts |

(Black Ink 4)

After the following components were mixed and dissolved fully with stirring, the solution was filtered through a micro filer having a pore size of 3.0 μm, (available from Fuji Photo Film Co., Ltd.) under pressure to prepare Black Ink 4.

| | |
|---|---|
| Pigment dispersion 4: | 30 parts |
| acetylene glycol ethyleneoxide adduct (ACETYLENOL EH, trade name, a product of KAWAKEN Fine Chemical, Ltd.): | 0.15 part |
| glycerol: | 5 parts |
| diethylene glycol: | 5 parts |
| trimethylol propane: | 6 parts |
| water: | 53.85 parts |

The main characteristics of the Black Inks 1 to 4 are shown in Table 1.

TABLE 1

| | Atomic group interposed between the self disperisble carbon black surface and a hydrophilic group | Self dispersible carbon black | | |
|---|---|---|---|---|
| | | Hydrophilic group of the surface | Counter ion | Salt in ink |
| Black Ink 1 | phenylene group | —COO$^-$ | Na$^+$ | K$_2$SO$_4$ |
| Black Ink 2 | phenylene group | —COO$^-$ | Na$^+$ | KCl |
| Black Ink 3 | phenylene group | —COO$^-$ | NH$_4^+$ | C$_6$H$_5$—COONH$_4$ |
| Black Ink 4 | none | —COO$^-$ | Na$^+$ | none |

By using an ink-jet recording apparatus, BJC-4000 (trade name, a product of Canon Inc.) equipped with an on-demand recording multi-head for applying thermal energy to ink in response to a recording signal for ejecting the ink, the following evaluations were made on each of the above Black Inks 1 to 4. The results are shown in Table 2.

1) Character Quality Grade

In each of the above inks, the above ink-jet recording apparatus is used to execute character printing on 5 types of plain paper A, B, C, D and E for copy, different in the permeability of ink and the resistance to bleeding of characters observed at that time was evaluated on the basis of the following criteria:

A: PPC paper NSK available from Canon Inc.

B: PPC paper NDK available from Canon Inc.

C: PPC paper 4024 available from Xerox Corp.

D: PPC Prover bond paper available from Fox River.

E: PPC paper for CANON Inc. available from Neusiedler Co.

○: Hardly any bleeding is observed on any of five types of paper.

Δ: Bleeding is observed on some types of paper.

X: Bleeding takes place on all five types of paper.

2) Optical Density of Print

In each of the above ink, the above ink-jet recording apparatus is used to execute character printing on 5 types of plain paper A, B, C, D and E for copy and the optical density of print observed at that time was measured using a Macbeth optical density of print measuring device and estimated on the basis of the following criteria:

- ○: Difference of not more than 0.1 in optical density of print of plain paper A, B, C, D and E for copy between maximum and minimum
- X: Difference of 0.1 or greater in optical density of print of plain paper A, B, C, D and E for copy between maximum and minimum.

3) Water Fastness

In each of the above inks, the above ink-jet recording apparatus was used to execute character printing on 5 types of plain paper A, B, C, D and E for copy as in Item 1) above and after the lapse of a predetermined time, a recording medium printed was dipped in a water stream to observe the condition of ground dirt visually and the results were estimated on the basis of the following criteria:

- ⊚: Ground dirt has become inconspicuous within an hour after the printing on all types of plain paper for copy A, B, C, D and E.
- ○: Ground dirt has become inconspicuous within one day after the printing on all types of plain paper for copy A, B, C, D and E.
- X: Ground dirt remains conspicuous on some type of plain paper even after the lapse of one day or longer from the printing.

4) Intermittent Ejecting Property

The above ink-jet recording apparatus was used to print a longitudinal line on plain paper for copy A, then print a longitudinal line again 30 seconds later and a difference between the two lines obtained was evaluated on the basis of the following criteria without performing pre-ejection or suction.

- ⊚: No difference is detectable even through observing with a loupe (a magnifying glass) between both lines.
- ○: No difference is detectable visually between both lines.
- Δ: A difference is detectable visually between both lines, but presents no problem in practical use.

TABLE 2

|  | Character quality grade | Optical density of print | Water fastness | Intermittent ejecting |
|---|---|---|---|---|
| Black Ink 1 | ○ | ○ | ○ | Δ |
| Black Ink 2 | ○ | ○ | ○ | ○ |
| BIack Ink 3 | ○ | ○ | ⊚ | ⊚ |
| Black Ink 4 | Δ | x | ○ | Δ |

As understood from the results of Table 2, the ink according to the first embodiment of the present invention is high in character quality and optical density of print for the recording, e.g. by the ink-jet recording method and these results hardly depend on types of paper.

Besides, Black Ink 3 with the counter ion of a hydrophilic group of self dispersible carbon black made to ammonium salt and moreover ammonium benzoate employed as the salt in the ink exhibited an excellent effect especially in water fastness.

EXPERIMENTAL EXAMPLE I-(2)

Evaluation of the Ink Set Using Ink According to the First Embodiment (Black Ink 1)

Black Ink 1 prepared in the same manner as in the Black Ink 1 of Experimental Example I-(1) was made ready.

(Black Ink 2)

Black Ink 2 prepared in the same manner as in the Black Ink 2 of Experimental Example I-(1) was made ready.

(Black Ink 3)

Black Ink 3 prepared in the same manner as in the Black Ink 3 of Experimental Example I-(1) was made ready.

(Black Ink 5)

In the same manner as in the Black Ink 1, Black Ink 5 was prepared using the following components:

| | |
|---|---|
| Pigment dispersion 3 prepared in Experimental Example I - (1): | 30 parts |
| acetylene glycol ethylene oxide adduct (ACETYLENOL EH, trade name, a product of KAWAKEN Fine Chemical, Ltd.): | 0.15 part |
| trimethylol propane: | 6 parts |
| glycerol: | 5 parts |
| diethylene glycol: | 5 parts |
| water: | 53.85 parts |

(Black Ink 6)

Preparation of Pigment Dispersion 5:

By the following method, the Pigment Dispersion 5 was prepared.

First of all, the following components were mixed and heated to 70° C. in a water bath to dissolve the resin part completely.

| | |
|---|---|
| styrene-acrylic acid-butylacrylate terpolymer (acid value: 60; weight average molecular weight: 13,000): | 3 parts |
| 1,3-bis-(β-hydroxyethyl) urea: | 0.5 part |
| ion exchange water: | 72.5 parts |
| diethylene glycol: | 5 parts |

Next, to the above mixture, 14 parts of carbon black, Color Black S170 (trade name, a product of Degussa) and 5 parts of isopropyl alcohol were added with premixing for 30 minutes and thereafter subjected to a disperse treatment under the following conditions:

Dispersing machine: Sand grinder (available from Igarashi Kikai Co.)

Pulverizing media: 1 mm diameter zirconium beads

Fill ratio of pulverizing media: 50% (by volume)

Pulverizing time: 3 hour

After the disperse treatment, a centrifugal treatment (12,000 rpm; for 20 minutes) was further made to remove rough particles, thereby obtaining Pigment dispersion 5.

Next, using the following components, Black Ink 6 was prepared in the same manner as in the Black Ink 1 mentioned above.

| | |
|---|---|
| Pigment dispersion 5: | 30 parts |
| acetylene glycol ethylene oxide adduct (ACETYLENOL EH, trade name, a product | 0.15 part |

-continued

| | |
|---|---|
| of KAWAKEN Fine Chemical, Ltd.): | |
| ethyl alcohol: | 6 parts |
| 2-methyl pyrrolidone: | 6 parts |
| water: | 57.85 parts |

(Yellow Ink 1)

After the following components were mixed and dissolved fully with stirring, the solution was filtered through a micro filer having a pore size of 3.0 μm, (available from Fuji Photo Film Co., Ltd.) under pressure to prepare Yellow Ink 1.

| | |
|---|---|
| acetylene glycol ethylene oxide adduct (ACETYLENOL EH, trade name, a product of KAWAKEN Fine Chemical, Ltd.): | 1 part |
| diethylene glycol: | 10 parts |
| glycerol: | 5 parts |
| C.I. Direct Yellow 86: | 3 parts |
| water: | 81 parts |

(Magenta Ink 1)

Using the following components, Magenta Ink 1 was prepared in the same manner as in the Yellow Ink 1 mentioned above.

| | |
|---|---|
| acetylene glycol ethylene oxide adduct (ACETYLENOL EH, trade name, a product of KAWAKEN Fine Chemical, Ltd.): | 1 part |
| thiodiglycol: | 20 parts |
| C.I. Acid Red 35: | 3 parts |
| water: | 76 parts |

(Cyan Ink 1)

Using the following components, Cyan Ink 1 was prepared in the same manner as in the Yellow Ink 1 mentioned above.

| | |
|---|---|
| acetylene glycol ethylene oxide adduct (ACETYLENOL EH, trade name, a product of KAWAKEN Fine Chemical, Ltd.): | 1 part |
| diethylene glycol: | 35 parts |
| C.I. Acid Blue 9: | 3 parts |
| water: | 61 parts |

EXAMPLE 1

An ink set was prepared by the following combination of the inks prepared above.
Black Ink 1
Yellow Ink 1
Magenta Ink 1
Cyan Ink 1

EXAMPLE 2

An ink set was prepared by the following combination of the inks prepared above.
Black Ink 2
Yellow Ink 1
Magenta Ink 1
Cyan Ink 1

EXAMPLE 3

An ink set was prepared by the following combination of the inks prepared above.
Black Ink 3
Yellow Ink 1
Magenta Ink 1
Cyan Ink 1

COMPARATIVE EXAMPLE 1

An ink set was prepared by the following combination of the inks prepared above.
Black Ink 5
Yellow Ink 1
Magenta Ink 1
Cyan Ink 1

COMPARATIVE EXAMPLE 2

An ink set was prepared by the following combination of the inks prepared above.
Black Ink 6
Yellow Ink 1
Magenta Ink 1
Cyan Ink 1

Table 3 shows the main compositions of individual types of Black Ink constituting the ink sets of Examples 1 to 3 and Comparative Examples 1 and 2.

TABLE 3

| | Atomic group interposed between the self dispersible carbon black surface and a hydrophilic group | Self dispersible carbon black | | | |
|---|---|---|---|---|---|
| | | Hydrophilic group of the surface | Counter ion | Salt in ink | Dispersant |
| Example (Black Ink 1) | phenylene group | $-COO^-$ | $Na^+$ | $K_2SO_4$ | None |
| Example 2 (Black Ink 2) | phenylene group | $-COO^-$ | $Na^+$ | KCl | None |
| Example 3 (Black Ink 3) | phenylene group | $-COO^-$ | $NH_4^+$ | $C_6H_5COONH_4$ | None |
| Comparative Example 1 (Black Ink 5) | phenylene group | $-COO^-$ | $Na^+$ | None | None |
| Comparative Example 2 (Black Ink 6) | None | None | None | None | Present |

The ink sets of Examples 1 to 3 and Comparative Examples 1 and 2 were used to make a record on the same 5 types of plain paper for copy A to E as mentioned above with the aid of an ink-jet recording apparatus BJC-4000 (trade name, a product of Canon Inc.) equipped with an on-demand recording multi-head for giving thermal energy to ink in response to a recording signal for ejecting ink and the following evaluations were performed as follows. The results are shown in Table 4.

1) Resistance to Bleeding

Solid printing was conducted on 5×5 meshed square portions (each portion's size: 2 cm×2 cm) in a 10 cm square, alternatively with black and color inks, and resistance to bleeding at the boundary between the black printing portion and the color printing portion was evaluated on the basis of the following criteria:

○: A boundary line between two colors is sharp and neither bleeding nor color mixture is observed.

Δ: The presence of a boundary line between two colors is clear, but a certain degree of bleeding or color mixture at the boundary is observed on part of paper types.

X: No boundary line between two colors is discernible.

TABLE 4

|  | Resistance to bleeding |
|---|---|
| Example 1 | ○ |
| Example 2 | ○ |
| Example 3 | ○ |
| Comparative Example 1 | x |
| Comparative Example 2 | x |

As evident from the above results, a color image free from or scant of bleeding can be recorded with any ink set using ink according to the first embodiment.

Pigment Dispersion 6:

After fully mixing 10 g of carbon black having a surface area of 230 m²/g and DBP oil absorption of 70 ml/100 g and 3.06 g of 3-amino-N-ethyl pyridinium bromide with 72 g of water, 1.62 g of nitric acid was added drop by drop to the mixture with stirring at 70° C. Here, several seconds later, a solution of 1.07 g of sodium nitrite dissolved in 5 g of water was add with further stirring for 1 hour. The obtained slurry was filtered through filter paper TOYO Filter Paper No. 2 (trade name, a product of Advantis Co.), and the pigment particles filtered out were fully washed with water and dried on a 110° C. oven. Further water was added to this pigment to prepare a 10% by weight aqueous dispersion of pigment. By the above method, the group expressed in terms of the chemical formula:

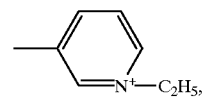

was introduced to the surface of carbon black.

(Black Ink 7)

After the Pigment dispersion 6 mentioned above and following components were mixed and dissolved fully with stirring, the liquid mixture was filtered through a micro filer having a pore size of 3.0 μm (available from Fuji Photo Film Co., Ltd.) under pressure to prepare Black Ink 7.

| Pigment dispersion 6: | 30 parts |
|---|---|
| ammonium sulfate: | 2 parts |
| trimethylol propane: | 6 parts |
| sodium tetradecylsulfonate: | 0.1 parts |
| glycerol: | 6 parts |
| thiodiglycol: | 6 parts |
| water: | 49.9 parts |

The main features of the Black Ink 7 obtained thus are shown below.

| | Atomic group interposed between the self dispersible carbon black surface and a hydrophilic group | Self dispersible carbon black | | |
|---|---|---|---|---|
| | | Hydrophilic group of the surface | Counter ion | Salt in ink |
| Black Ink 7 | none | —⟨pyridinium-N⁺—C₂H₅⟩ | NO₃⁻ | (NH₄)₂SO₄ |

The character quality grade, optical density of print, and water fastness were evaluated for Black Ink 7 above according to the method and criteria identical to those employed for Black Inks 1 to 4 above, and all the evaluated items were judged as "○".

EXPERIMENTAL EXAMPLE II-(1)

Evaluation of the Ink According to the Second Embodiment (Black Ink 8)

After the following components were mixed and dissolved with fully stirring, the solution was filtered through a micro filer having a pore size of 3 μm (available from Fuji Photo Film Co., Ltd.) under pressure to prepare Black Ink 8.

| | |
|---|---|
| Pigment dispersion 1 | 30 parts |
| potassium sulfate | 1 part |
| sodium dodecylbenzenesulfonate | 0.1 part |
| trimethylol propane | 6 parts |
| glycerol | 6 parts |
| diethylene glycol | 6 parts |
| acetylene glycol ethyleneoxide adduct (ACETYLENOL EH, trade name, a product of KAWAKEN Fine Chemical, Ltd.) | 0.2 part |
| water | 50.7 parts |

(Black Ink 9)

Using the following components, Black Ink 9 was prepared in the same manner as in the Black Ink 8 mentioned above.

| | |
|---|---|
| Pigment dispersion 2 | 30 parts |
| potassium chloride | 0.5 part |
| sodium dodecylbenzenesulfonate | 0.15 part |
| trimethylol propane | 6 parts |
| acetylene glycol ethyleneoxide adduct (ACETYLENOL EH, trade name, a product of KAWAKEN Fine Chemical, Ltd.) | 0.15 part |
| glycerol | 5 parts |
| ethylene glycol | 5 parts |
| water | 53.2 parts |

(Black Ink 10)

Using the following components, Black Ink 10 was prepared in the same manner as in the Black Ink 8 mentioned above.

| | |
|---|---|
| Pigment dispersion 2 | 30 parts |
| ammonium sulfate | 2 parts |
| sodium dodecylbenzenesulfonate | 0.1 part |
| trimethylol propane | 6 parts |
| sodium tetradecylsulfonate | 0.1 parts |
| glycerol | 6 parts |
| thiodiglycol | 6 parts |
| water | 49.8 parts |

(Black Ink 11)

Using the following components, Black Ink 11 was prepared in the same manner as in the Black Ink 8 mentioned above.

| | |
|---|---|
| Pigment dispersion 3 | 30 parts |
| ammonium benzoate | 1 part |
| sodium dodecylbenzenesulfonate | 0.15 part |
| trimethylol propane | 6 parts |
| acetylene glycol ethyleneoxide adduct (ACETYLENOL EH, trade name, a product of KAWAKEN Fine Chemical, Ltd.) | 0.15 part |
| glycerol | 5 parts |
| ethylene glycol | 5 parts |
| water | 52.7 parts |

The main features of the Black Inks 8 to 11 mentioned above are shown in Table 5.

TABLE 5

| | Atomic group interposed between the self dispersible carbon black surface and a hydrophilic group | Self dispersible carbon black | | | |
|---|---|---|---|---|---|
| | | Hydrophilic group of the surface | Counter ion | Salt | Stability |
| Black Ink 8 | phenylene group | —COO$^-$ | Na$^+$ | K$_2$SO$_4$ | sodium dodecylbenzenesulfonate |
| Black Ink 9 | phenylene group | —COO$^-$ | Na$^+$ | KCl | sodium dodecylbenzenesulfonate |
| Black Ink 10 | phenylene group | —COO$^-$ | Na$^+$ | (NH$_4$)$_2$SO$_4$ | sodium dodecylbenzenesulfonate |
| Black Ink 11 | phenylene group | —COO$^-$ | NH$_4^+$ | C$_6$H$_5$COONH$_4$ | sodium dodecylbenzenesulfonate |

An evaluation was made of the preserving stability of each of the Black Inks 8 to 11 mentioned above. Namely, in four 100 ml capacity glass receptacles (available from Shot Co.), 100 ml of the respective Black Inks 8 to 11 mentioned above were put into individual receptacles and left standing at 60° C. for one month to observe the presence of a change in ink viscosity between before and after the standing. The results are shown in Table 6. Incidentally, the criteria are as follows:

○: Hardly any viscosity change in ink is recognizable between before and after the standing.

X: A viscosity change in ink is recognizable between before and after the standing.

TABLE 6

| | Reserving stability |
|---|---|
| Black Ink 8 | ○ |
| Black Ink 9 | ○ |
| Black Ink 10 | ○ |
| Black Ink 11 | ○ |

EXPERIMENTAL EXAMPLE II-(2)

Evaluation of the Ink According to the Second Embodiment (Black Ink 8)

Black Ink 8 prepared in the same manner as in the Black Ink 8 of Experimental Example II-(1) was made ready.

(Black Ink 9)

Black Ink 9 prepared in the same manner as in the Black Ink 9 of Experimental Example II-(1) was made ready.

(Black Ink 10)
Black Ink 10 prepared in the same manner as in the Black Ink 10 of Experimental Example II-(1) was made ready.
(Black Ink 11)
Black Ink 11 prepared in the same manner as in the Black Ink 11 of Experimental Example II-(1) was made ready.
(Yellow Ink 1)
Yellow Ink 1 prepared in the same manner as in the Yellow Ink 1 of Experimental Example I-(2) was made ready.
(Magenta Ink 1)
Magenta Ink 1 prepared in the same manner as in the Magenta Ink 1 of Experimental Example I-(2) was made ready.
(Cyan Ink 1)
Cyan Ink 1 prepared in the same manner as in the Cyan Ink 1 of Experimental Example I-(2) was made ready.

EXAMPLE 4

An ink set was prepared by the following combination of the color inks prepared above.
Black Ink 8
Yellow Ink 1
Magenta Ink 1
Cyan Ink 1

EXAMPLE 5

Black Ink 9
Yellow Ink 1
Magenta Ink 1
Cyan Ink 1

EXAMPLE 6

Black Ink 10
Yellow Ink 1
Magenta Ink 1
Cyan Ink 1

EXAMPLE 7

Black Ink 11
Yellow Ink 1
Magenta Ink 1
Cyan Ink 1

On the ink sets of Examples 4 to 7, an evaluation was made with respect to resistance to bleeding in the same manner as in Experimental Example I-(2). The results are shown in Table 7.

TABLE 7

| | Resistance to Bleeding |
|---|---|
| Example 4 | o |
| Example 5 | o |
| Example 6 | o |
| Example 7 | o |

EXPERIMENTAL EXAMPLE III-(1)

Evaluation of the Ink According to the Third Embodiment (Black Ink 12)
After the following components were mixed and dissolved fully with stirring, the solution was adjusted to a pH of 10.5 by adding potassium hydroxide and thereafter filtered through a micro filer having a pore size of 3 μm (available from Fuji Photo Film Co., Ltd.) under pressure to prepare Black Ink 12.

| | |
|---|---|
| Pigment dispersion 1 prepared in Experimental Example I - (1) | 30 parts |
| potassium sulfate | 1 part |
| trimethylol propane | 6 parts |
| glycerol | 6 parts |
| diethylene glycol | 6 parts |
| acetylene glycol ethyleneoxide adduct (ACETYLENOL EH, trade name, a product of KAWAKEN Fine Chemical, Ltd.) | 0.2 part |
| water | 50.8 parts |

(Black Ink 13)
Using the following components, Black Ink 13 was prepared in the same manner as in the Black Ink 12 mentioned above. Incidentally, the pH was adjusted to 11 by using an aqueous ammonia.

| | |
|---|---|
| Pigment dispersion 2 prepared in Experimental Example I - (1) | 30 parts |
| potassium chloride | 0.5 part |
| trimethylol propane | 6 parts |
| acetylene glycol ethyleneoxide adduct (ACETYLENOL EH, trade name, a product of KAWAKEN Fine Chemical, Ltd.) | 0.15 part |
| glycerol | 5 parts |
| ethylene glycol | 5 parts |
| water | 53.35 parts |

(Black Ink 14)
Using the following components, Black Ink 14 was prepared in the same manner as in the Black Ink 12 mentioned above. Incidentally, the pH was adjusted to 11 by using a lithium hydroxide.

| | |
|---|---|
| Pigment dispersion 2 prepared in Experimental Example I - (1) | 30 parts |
| ammonium sulfate | 2 parts |
| trimethylol propane | 6 parts |
| sodium tetradecylsulfonate | 0.1 part |
| glycerol | 6 parts |
| thiodiglycol | 6 parts |
| water | 49.9 parts |

(Black Ink 15)
Using the following components, Black Ink 15 was prepared in the same manner as in the Black Ink 12 mentioned above. Incidentally, the pH was adjusted to 11 by using an aqueous ammonia.

| | |
|---|---|
| Pigment dispersion 3 prepared in Experimental Example I - (1) | 30 parts |
| ammonium benzoate | 1 part |
| trimethylol propane | 6 parts |
| acetylene glycol ethyleneoxide adduct (ACETYLENOL EH, trade name, a product of KAWAKEN Fine Chemical, Ltd.) | 0.15 part |
| glycerol | 5 parts |
| ethylene glycol | 5 parts |

The main features of the Black Inks 12 to 15 obtained thus are shown in Table 8.

TABLE 8

| | Atomic group interposed between the self dispersible carbon black surface and a hydrophilic group | Self dispersible carbon black | | | |
|---|---|---|---|---|---|
| | | Hydrophilic group of the surface | Counter ion | Salt in ink | pH |
| Black Ink 12 | phenylene group | —COO$^-$ | Na$^+$ | K$_2$SO$_4$ | 10.5 |
| Black Ink 13 | phenylene group | —COO$^-$ | Na$^+$ | KCl | 11 |
| Black Ink 14 | phenylene group | —COO$^-$ | Na$^+$ | (NH$_4$)$_2$SO$_4$ | 11 |
| Black Ink 15 | phenylene group | —COO$^-$ | NH$_4$$^+$ | C$_6$H$_5$COONH$_4$ | 11 |

An evaluation was made for the preserving stability of each of the Black Inks 12 to 15 mentioned above. Namely, in four 100 ml capacity glass receptacles (available from Shot Co.), 100 ml of the respective Black Inks 12 to 15 mentioned above were put into individual receptacles and left standing to observe the presence of a change in ink viscosity between before and after the standing. The results are shown in Table 9. Incidentally, the criteria are as follows:

○: Hardly any viscosity change in ink is recognizable between before and after the standing.

X: A viscosity change in ink is recognizable between before and after the standing.

TABLE 9

| | Reserving stability |
|---|---|
| Black Ink 12 | ○ |
| Black Ink 13 | ○ |
| Black Ink 14 | ○ |
| Black Ink 15 | ○ |

EXPERIMENTAL EXAMPLE III-(2)

(Black Ink 12)

Black Ink 12 prepared in the same manner as in the Black Ink 12 of Experimental Example III-(1) was made ready.

(Black Ink 13)

Black Ink 13 prepared in the same manner as in the Black Ink 13 of Experimental Example III-(1) was made ready.

(Black Ink 14)

Black Ink 14 prepared in the same manner as in the Black Ink 14 of Experimental Example III-(1) was made ready.

(Black Ink 15)

Black Ink 15 prepared in the same manner as in the Black Ink 15 of Experimental Example III-(1) was made ready.

(Black Ink 16)

After the following components were mixed and dissolved fully with stirring, the solution was adjusted to a pH of 11 by using potassium hydroxide and thereafter filtered through a micro filer having a pore size of 3 μm (available from Fuji Photo Film Co., Ltd.) under pressure to prepare Black Ink 16.

| | |
|---|---|
| Pigment dispersion 5 prepared in Experimental Example I - (2) | 30 parts |
| acetylene glycol ethyleneoxide adduct (ACETYLENOL EH, trade name, a product of KAWAKEN Fine Chemical, Ltd.) | 0.15 part |
| ethyl alcohol | 6 parts |

-continued

| | |
|---|---|
| 2-methylpyrrolidone | 6 parts |
| water | 57.85 parts |

(Yellow Ink 1)

Yellow Ink 1 prepared in the same manner as in the Yellow Ink 1 of Experimental Example I-(2) was made ready.

(Magenta Ink 1)

Magenta Ink 1 prepared in the same manner as in the Magenta Ink 1 of Experimental Example I-(2) was made ready.

(Cyan Ink 1)

Cyan Ink 1 prepared in the same manner as in the Cyan Ink 1 of Experimental Example I-(2) was made ready.

EXAMPLE 8

An ink set was prepared by the following combination of the inks made ready above.

Black Ink 12
Yellow Ink 1
Magenta Ink 1
Cyan Ink 1

EXAMPLE 9

An ink set is prepared by the following combination of the inks made ready above.

Black Ink 13
Yellow Ink 1
Magenta Ink 1
Cyan Ink 1

EXAMPLE 10

An ink set is prepared by the following combination of the inks made ready above.

Black Ink 14
Yellow Ink 1
Magenta Ink 1
Cyan Ink 1

EXAMPLE 11

An ink set is prepared by the following combination of the inks made ready above.

Black Ink 15
Yellow Ink 1
Magenta Ink 1
Cyan Ink 1

COMPARATIVE EXAMPLE 3

Black Ink 16
Yellow Ink 1
Magenta Ink 1
Cyan Ink 1

Table 10 shows the main features of the Black Ink constituting the ink sets of Examples 8 to 11 and Comparative Example 3.

TABLE 10

| | Atomic group interposed between the self dispersible carbon black surface and a hydrophilic group | Self dispersible carbon black | | | |
|---|---|---|---|---|---|
| | | Hydrophilic group of the surface | Counter –ion | Salt in ink | pH |
| Example 8 (Black Ink 12) | phenylene group | —COO$^-$ | Na$^+$ | K$_2$SO$_4$ | 10.5 |
| Example 9 (Black Ink 13) | phenylene group | —COO$^-$ | Na$^+$ | KCl | 11 |
| Example 10 (Black Ink 14) | phenylene group | —COO$^-$ | Na$^+$ | (NH$_4$)$_2$SO$_4$ | 11 |
| Example 11 (Black Ink 15) | phenylene group | —COO$^-$ | NH$_4^+$ | C$_6$H$_5$COONH$_4$ | 11 |
| Comparative example 3 (Black Ink 16) | None | None | | None | 11 |

On the ink sets of Examples 9 to 12 and Comparative Example 3, an evaluation was made for resistance to bleeding in the same manner as in Experimental Example I-(2). The results are shown in Table 11.

TABLE 11

| | Resistance to bleeding |
|---|---|
| Example 8 | ○ |
| Example 9 | ○ |
| Example 10 | ○ |
| Example 11 | ○ |
| Comparative example 3 | x |

EXPERIMENTAL EXAMPLE IV-(1)

Evaluation of the Ink According to the Fourth Embodiment (Black Ink 17)

Using the following components, Black Ink 17 was prepared in the same manner as in the Black Ink prepared above.

| | |
|---|---|
| Pigment dispersion 1 of Experimental Example I - (1) | 30 parts |
| potassium sulfate | 1 part |
| sodium sulfite | 0.3 part |
| trimethylol propane | 6 parts |
| glycerol | 6 parts |
| diethylene glycol | 6 parts |
| acetylene glycol ethylene oxide adduct (ACETYLENOL EH, trade name, a product of KAWAKEN Fine Chemical, Ltd.) | 0.2 part |
| water | 50.5 parts |

(Black Ink 18)

Using the following components, Black Ink 18 was prepared in the same manner as in the Black Ink prepared above.

| | |
|---|---|
| Pigment dispersion 2 of Experimental Example I - (1) | 30 parts |
| potassium chloride | 0.5 part |
| sodium ascorbate | 0.15 part |
| trimethylol propane | 6 parts |
| glycerol | 5 parts |
| ethylene glycol | 5 parts |
| acetylene glycol ethylene oxide adduct (ACETYLENOL EH, trade name, a product of KAWAKEN Fine Chemical, Ltd.) | 0.15 part |
| water | 53.2 parts |

(Black Ink 19)

Using the following components, Black Ink 19 was prepared in the same manner as in the Black Ink prepared above.

| | |
|---|---|
| Pigment dispersion 2 of Experimental Example I - (1) | 30 parts |
| ammonium sulfate | 2 parts |
| sodium sulfite | 0.1 part |
| trimethylol propane | 6 parts |
| sodium tetradecylsulfonate | 0.1 parts |
| glycerol | 6 parts |
| thiodiglycol | 6 parts |
| water | 49.8 parts |

(Black Ink 20)

Using the following components, Black Ink 20 was prepared in the same manner as in the Black Ink prepared above.

| | |
|---|---|
| Pigment dispersion 3 of Experimental Example I - (1) | 30 parts |
| ammonium benzoate | 1 part |
| sodium ascorbate | 0.15 part |
| trimethylol propane | 6 parts |
| glycerol | 5 parts |
| ethylene glycol | 5 parts |
| acetylene glycol ethylene oxide adduct (ACETYLENOL EH, trade name, a product of KAWAKEN Fine Chemical, Ltd.) | 0.15 part |
| water | 52.7 parts |

The main features of the respective Black Inks 17 to 20 obtained thus are shown in Table 12.

TABLE 12

| | Atomic group interposed between the self dispersible carbon black surface and a hydrophilic group | Self dispersible carbon black | | | |
|---|---|---|---|---|---|
| | | Hydrophilic group of the surface | Counter ion | Salt | Antioxidant |
| Black Ink 17 | phenylene group | —COO$^-$ | Na$^+$ | K$_2$SO$_4$ | sodium sulfite |
| Black Ink 18 | phenylene group | —COO$^-$ | Na$^+$ | KCl | sodium ascorbate |
| Black Ink 19 | phenylene group | —COO$^-$ | Na$^+$ | (NH$_4$)$_2$SO$_4$ | sodium sulfite |
| Black Ink 20 | phenylene group | —COO$^-$ | NH$_4^+$ | C$_6$H$_5$COONH$_4$ | sodium ascorbate |

An estimate was made on the preserving stability of each of the Black Inks 17 to 20 mentioned above as the same way as in the Experimental Example II-(1). The results are shown in Table 13.

TABLE 13

| | Reserving stability |
|---|---|
| Black Ink 17 | ○ |
| Black Ink 18 | ○ |
| Black Ink 19 | ○ |
| Black Ink 20 | ○ |

EXPERIMENTAL EXAMPLE IV-(2)

Evaluation of Ink Sets Using the Ink According to the Fourth Embodiment (Black Ink 17)

Black Ink 17 prepared in the same manner as in the Black Ink 17 of Experimental Example IV-(1) was made ready.

(Black Ink 18)

Black Ink 18 prepared in the same manner as in the Black Ink 18 of Experimental Example IV-(1) was made ready.

(Black Ink 19)

Black Ink 19 prepared in the same manner as in the Black Ink 19 of Experimental Example IV-(1) was made ready.

(Black Ink 20)

Black Ink 20 prepared in the same manner as in the Black Ink 20 of Experimental Example IV-(1) was made ready.

(Yellow Ink 1)

Yellow Ink 1 prepared in the same manner as in the Yellow Ink 1 of Experimental Example I-(2) was made ready.

(Magenta Ink 1)

Magenta Ink 1 prepared in the same manner as in the Magenta Ink 1 of Experimental Example I-(2) was made ready.

(Cyan Ink 1)

Cyan Ink 1 prepared in the same manner as in the Cyan Ink 1 of Experimental Example I-(2) was made ready.

EXAMPLE 12

An ink set is prepared by the following combination of the inks made ready above.

Black Ink 17
Yellow Ink 1
Magenta Ink 1
Cyan Ink 1

EXAMPLE 13

An ink set is prepared by the following combination of the inks made ready above.

Black Ink 18
Yellow Ink 1
Magenta Ink 1
Cyan Ink 1

EXAMPLE 14

An ink set is prepared by the following combination of the inks made ready above.

Black Ink 19
Yellow Ink 1
Magenta Ink 1
Cyan Ink 1

EXAMPLE 15

An ink set is prepared by the following combination of the inks made ready above.

Black Ink 20
Yellow Ink 1
Magenta Ink 1
Cyan Ink 1

On the ink sets of Examples 12 to 15, an evaluation was made on resistance to bleeding in the same manner as in Experimental Example I-(2). The results are shown in Table 14.

TABLE 14

| | Resistance to bleeding |
|---|---|
| Example 12 | ○ |
| Example 13 | ○ |
| Example 14 | ○ |
| Example 15 | ○ |

EXPERIMENTAL EXAMPLE V-(1)

Evaluation of the Ink According to the Fifth Embodiment (Black Ink 21)

Using the following components, Black Ink 21 was prepared in the same manner as in the Black Ink prepared above.

| | |
|---|---|
| Pigment dispersion 1 of Experimental Example I - (1) | 30 parts |
| potassium sulfate | 1 part |
| trimethylol propane | 6 parts |
| glycerol | 6 parts |
| diethylene glycol | 6 parts |
| acetylene glycol ethylene oxide adduct (ACETYLENOL EH, trade name, a product of KAWAKEN Fine Chemical, Ltd.) | 0.2 part |
| sodium alginate | 0.1 part |
| water | 50.7 parts |

(Black Ink 22)

Using the following components, Black Ink 22 was prepared in the same manner as in the Black Ink prepared above.

| | |
|---|---|
| Pigment dispersion 2 of Experimental Example I - (1) | 30 parts |
| potassium chloride | 0.5 part |
| trimethylol propane | 6 parts |
| glycerol | 5 parts |
| ethylene glycol | 5 parts |
| acetylene glycol ethylene oxide adduct (ACETYLENOL EH, trade name, a product of KAWAKEN Fine Chemical, Ltd.) | 0.15 part |
| sodium polyacrylate | 0.1 part |
| water | 53.25 parts |

(Black Ink 23)

Using the following components, Black Ink 23 was prepared in the same manner as in the Black Ink prepared above.

| | |
|---|---|
| Pigment dispersion 3 of Experimental Example I - (1) | 30 parts |
| ammonium benzoate | 1 part |
| trimethylol propane | 6 parts |
| glycerol | 5 parts |
| ethylene glycol | 5 parts |
| acetylene glycol ethylene oxide adduct (ACETYLENOL EH, trade name, a product of KAWAKEN Fine Chemical, Ltd.) | 0.15 part |
| sodium polyacrylate | 0.1 part |
| water | 52.75 parts |

(Black Ink 24)

Using the following components, Black Ink 24 was prepared in the same manner as in the Black Ink prepared above.

| | |
|---|---|
| Pigment dispersion 6 of Experimental Example I - (2) | 30 parts |
| ammonium sulfate | 2 parts |
| trimethylol propane | 6 parts |
| sodium alginate | 0.1 part |
| glycerol | 6 parts |
| thiodiglycol | 6 parts |
| water | 49.9 parts |

The main features of the Black Inks 21 to 24 obtained thus are shown in Table 15.

TABLE 15

| | Atomic group interposed between the self dispersible carbon black surface and a hydrophilic group | Self dispersible carbon black | | | Water-soluble polymer compound |
|---|---|---|---|---|---|
| | | Hydrophilic group of the surface | Counter ion | Salt | |
| Black Ink 21 | phenylene group | —COO$^-$ | Na$^+$ | K$_2$SO$_4$ | sodium alginate |
| Black Ink 22 | phenylene group | —COO$^-$ | Na$^+$ | KCl | sodium polyacrylate |
| Black Ink 23 | phenylene group | —COO$^-$ | NH$_4^+$ | C$_6$H$_5$COONH$_4$ | sodium polyacrylate |
| Black Ink 24 | None | —C$_6$H$_4$—N$^+$=C$_2$H$_5$ | NO$_3^-$ | (NH$_4$)$_2$SO$_4$ | sodium alginate |

Each of the Black Inks 21 to 24 mentioned above was applied to an ink-jet recording apparatus BJC-4000 (trade name, a product of Canon Inc.) equipped with an on-demand recording multi-head for applying thermal energy to ink in response to a recording signal for ejecting ink and the following evaluations were performed as follows. The results are shown in Table 16.

1) Character Quality Grade

Each of the above inks is charged to the above ink-jet recording apparatus to execute character printing on 5 types of plain paper for copy A, B, C, D and E mentioned above and the resistance to bleeding of characters observed at that time was evaluated on the basis of the following criteria:

○: Hardly any bleeding is observed on any type of paper.
Δ: Bleeding is observed on some types of paper.
X: Bleeding takes place on all five types of paper.

2) Optical Density of Print

Each of the above inks is charged to the above ink-jet recording apparatus to execute character printing on 5 types of plain paper for copy A, B, C, D and E and the optical density of print observed at that time was measured using a optical density of print measuring device available from Macbeth Co. and evaluated on the basis of the following criteria:

○: Difference of not more than 0.1 in optical density of print of plain paper for copy A, B, C, D and E between maximum and minimum.
X: Difference of 0.1 or greater in optical density of print of plain paper for copy A, B, C, D and E between maximum and minimum.

3) Scratch Resistance

Each of the above inks was charged to the above ink-jet recording apparatus to execute character printing on 5 types of plain paper for copy A, B, C, D and E and, after left standing for one-day, a scratch test was made on the printed paper by using a weight of 40 g/cm² load to evaluate the scratch resistance on the basis of the criteria mentioned below:

○: No stain is noticeable on any type of paper.
Δ: Stains are noticeable on some types of paper.
X: Stains are noticeable on all types of paper.

4) Water Fastness

Each of the above inks was charged to the above ink-jet recording apparatus to execute character printing on 5 types of plain paper for copy A, B, C, D and E as in Item 1) and after the lapse of a predetermined time, a recording medium printed was dipped in a water stream to observe the condition of ground dirt visually and the results were evaluated on the basis of the following criteria:

⊚: Ground dirt has become inconspicuous within an hour after the printing on all types of plain paper for copy A, B, C, D and E.
○: Ground dirt has become inconspicuous within one day after the printing on all types of plain paper for copy A, B, C, D and E.
X: Ground dirt remains conspicuous on some type of plain paper even after the lapse of one day or longer from the printing.

TABLE 16

|  | Character Quality Grade | Optical Density of Print | Scratch Resistance | Water fastness |
|---|---|---|---|---|
| Black Ink 21 | ○ | ○ | ○ | ○ |
| Black Ink 22 | ○ | ○ | ○ | ○ |
| Black Ink 23 | ○ | ○ | ○ | ⊚ |
| Black Ink 24 | ○ | ○ | ○ | ○ |

EXPERIMENTAL EXAMPLE V-(2)

Evaluation of Ink Sets Using the Ink According to the Fifth Embodiment (Black Ink 21)

Black Ink 21 prepared in the same manner as in the Black Ink 21 of Experimental Example V-(1) was made ready.

(Black Ink 22)

Black Ink 22 prepared in the same manner as in the Black Ink 22 of Experimental Example V-(1) was made ready.

(Black Ink 23)

Black Ink 23 prepared in the same manner as in the Black Ink 18 of Experimental Example V-(1) was made ready.

(Black Ink 24)

Black Ink 24 was prepared in the same manner as in the Black Ink 23 of Experimental Example V-(1) was made ready.

(Black Ink 25)

Using the following components in the same manner as in the Black Ink prepared above Black Ink 25 was prepared:

| Pigment dispersion 2 of Experimental Example I - (1) | 30 parts |
|---|---|
| ammonium sulfate | 2 parts |
| trimethylol propane | 6 parts |
| sodium alginate | 0.1 part |
| glycerol | 6 parts |
| thiodiglycol | 6 parts |
| water | 49.9 parts |

(Yellow Ink 1)

Yellow Ink prepared in the same manner as in the Yellow Ink 1 of Experimental Example I-(2) was made ready.

(Magenta Ink 1)

Magenta Ink prepared in the same manner as in the Magenta Ink 1 of Experimental Example I-(2) was made ready.

(Cyan Ink 1)

Cyan Ink prepared in the same manner as in the Cyan Ink 1 of Experimental Example I-(2) was made ready.

EXAMPLE 16

An ink set was prepared by the following combination of various types of color ink made ready above.

Black Ink 21
Yellow Ink 1
Magenta Ink 1
Cyan Ink 1

EXAMPLE 17

An ink set was prepared by the following combination of the inks made ready above.

Black Ink 22
Yellow Ink 1
Magenta Ink 1
Cyan Ink 1

EXAMPLE 18

An ink set was prepared by the following combination of the inks made ready above.
Black Ink 23
Yellow Ink 1
Magenta Ink 1
Cyan Ink 1

EXAMPLE 19

An ink set was prepared by the following combination of the inks made ready above.
Black Ink 25
Yellow Ink 1
Magenta Ink 1
Cyan Ink 1

COMPARATIVE EXAMPLE 4

An ink set similar to that employed for Comparative Example 2 in Experimental Example I-(2) was made ready above.

Table 17 shows the main features of teh black ink types used in the ink sets of Examples 16 to 19 and

COMPARATIVE EXAMPLE 4.

TABLE 17

|  | Atomic group interposed between the self dispersible carbon black surface and a hydrophilic group | Self dispersible carbon black | | | Water-soluble polymer compound |
|---|---|---|---|---|---|
|  |  | Hydrophilic group of the surface | Counter ion | Salt |  |
| Example 16 (Black Ink 21) | phenylene group | —COO⁻ | Na⁺ | $K_2SO_4$ | sodium alginate |
| Example 17 (Black Ink 22) | phenylene group | —COO⁻ | Na⁺ | KCl | sodium polyacrylate |
| Example 18 (Black Ink 23) | phenylene group | —COO⁻ | $NH_4^+$ | $C_6H_5COONH_4$ | sodium polyacrylate |
| Example 19 (Black Ink 25) | phenylene group | —COO⁻ | Na⁺ | $(NH_4)_2SO_4$ | sodium alginate |
| Comparative example 4 (Black Ink 6) | None | None | | None | None |

On the ink sets of Examples 17 to 20 and Comparative Example 4, an evaluation was made on resistance to bleeding in the same manner as in Experimental Example I-(2), while an evaluation was made on scratch resistance in the same manner as in Experimental Example V-(1). The results are shown in Table 18.

TABLE 18

|  | Resistance to bleeding | Scratch resistance |
|---|---|---|
| Example 16 | ○ | ○ |
| Example 17 | ○ | ○ |

TABLE 18-continued

|  | Resistance to bleeding | Scratch resistance |
|---|---|---|
| Example 18 | ○ | ○ |
| Example 19 | ○ | ○ |
| Comparative example 4 | x | Δ |

As described above, according to individual embodiments of the present invention, for example, the following advantages can be obtained.

(1) Ink capable of mitigating the influence of recording media exerted upon the image quality grade and stably giving a high grade image can be obtained.

(2) Ink capable of minimizing the pH dependence of ink quality and stably keeping the properties of ink is obtained.

(3) Ink hardly changeable in quality e.g. in ejecting property of ink even for a long period of preservation, is obtained.

(4) Ink excellent in the scratch resistance of printed matter and that almost independently of recording medium types can be obtained.

(5) An ink set capable of effectively inhibiting the bleeding can be obtained.

(6) An imaging apparatus and an imaging method capable of mitigating the influence of recording media exerted upon the image quality grade and stably forming a high grade image and further an ink cartridge and a recording unit used therein can be obtained.

What is claimed is:

1. An ink for forming a print image having an optical density on a recording medium by an ink-jet method, wherein the ink comprises at least one salt selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$, and $(M1)_2CO_3$, wherein M1 is an alkali metal, ammonium or organic ammonium and Ph is a phenyl group, and a self dispersing carbon black; and wherein the concentration of the carbon black is such that the optical density of the image cannot be obtained when no salt is contained in the ink.

2. The ink according to claim 1, wherein the salt is contained in an amount of from 0.05 to 10% by weight relative to the whole weight of ink.

3. The ink according to claim 2, wherein the salt is contained in an amount of from 0.1 to 5% by weight relative to the whole weight of ink.

4. The ink according to claim 1, wherein the carbon black has at least one hydrophilic group bonded directly or via another atomic group to the surface.

5. The ink according to claim 4, wherein the hydrophilic group is at least one selected from the group consisting of —COO(M2), —SO$_3$(M2)$_2$, —PO$_3$H(M2), —NH$_3^+$, —NR$_3^+$, —SO$_2$N$^+$H$_4$, —SO$_2$N$^+$H$_s$COR,

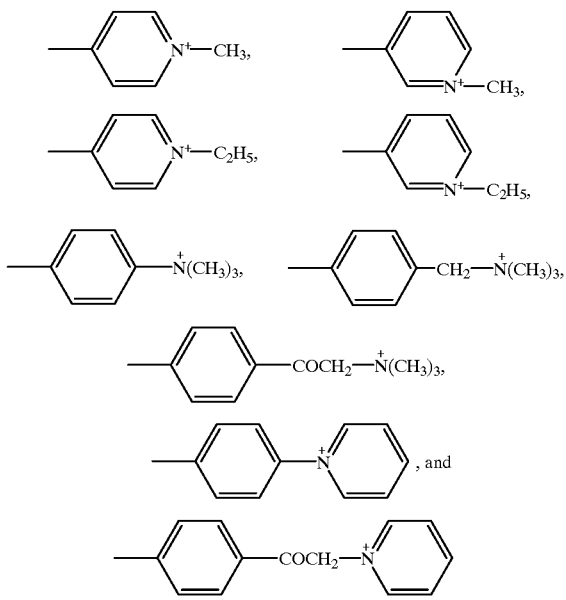

where M2 in the formulae is a hydrogen atom, an alkali metal, ammonium or organo-ammonium and R is an alkyl group having 1 to 12 carbon atoms, a substituted or unsubstituted phenyl group or substituted or unsubstituted naphthyl group.

6. The ink according to claim 4, wherein the another atomic group is an alkylene group having 1 to 12 carbon atoms, a substituted or unsubstituted phenylene group or substituted or unsubstituted naphthylene group.

7. The ink according to claim 4, wherein the hydrophilic group is at least one selected from the group consisting of —COO(M2), —SO$_3$(M2)$_2$ and —PO$_3$H(M2)$_2$ where M2 is the same as M1.

8. The ink according to claim 1, wherein the ink further comprises a stabilizer.

9. The ink according to claim 8, wherein the stabilizer is a surfactant.

10. The ink according to claim 9, wherein the surfactant is an ionic surfactant.

11. The ink according to claim 8, wherein the stabilizer is dodecylbenzenesulfonate.

12. The ink according to claim 8, wherein the stabilizer is contained in an amount of from 0.02 to 0.1% by weight.

13. The ink according to claim 1, wherein the ink has a pH of from 9 to 12.

14. The ink according to claim 13, wherein the ink has a pH of from 9 to 11.

15. The ink according to claim 1, wherein the ink further comprises an antioxidant.

16. The ink according to claim 15, wherein the antioxidant is contained in an amount of from 0.02 to 10% by weight.

17. Ink as set forth in claim 15, wherein the antioxidant is at least one selected from the group consisting of sulfites, ascorbates and hydrogensulfite.

18. The ink according to claim 1, wherein the ink further comprises a water-soluble polymer compound.

19. The ink according to claim 18, wherein the water-soluble polymer compound has a weight average molecular weight of from 1,000 to 5000.

20. The ink according to claim 18, wherein the water-soluble polymer compound is contained in an amount of from 0.02 to 2% by weight relative to the whole weight of ink.

21. The ink according to claim 18, wherein the water-soluble polymer compound is contained in an amount of from 0.1 to 1% by weight relative to the whole weight of ink.

22. The ink according to claim 1, wherein Ka value measured by the Bristow method is not more than 1.5.

23. The ink according to claim 22, wherein the Ka value measured by the Bristow method is within a range of from 0.2 to 1.5.

24. An ink set comprising a combination of aqueous ink comprising at least one coloring material selected from coloring materials for cyan, for magenta, for yellow, for red, for green and for blue and the ink according to claim 1.

25. The ink set according to claim 24, wherein the coloring material is an acid dye or a direct dye.

26. The ink set according to claim 24, wherein the coloring material is a pigment.

27. An ink cartridge comprising an ink tank for storing the ink therein according to claim 1.

28. A recording unit comprising an ink storing section for storing the ink according to claim 1 and a head section for ejecting the ink.

29. An image recording apparatus comprising:
an ink cartridge having the ink tank for storing ink according to claim 1, a recording head for ejecting the ink and supply means for supplying the ink to the recording head from the ink cartridge.

30. An image recording apparatus comprising:
an ink storing section for storing the ink according to claim 1, and a recording unit equipped with the section for ejecting the ink.

31. An image recording apparatus comprising:
an ink storing section for storing aqueous ink comprising at least one coloring material selected from coloring materials for cyan, for magenta, for yellow, for red, for green and for blue, an ink storing section for storing the ink according to claim 1 and head sections for respectively ejecting the ink stored in individual ink storing sections.

32. An image recording apparatus comprising:
an ink cartridge equipped with an ink storing section for storing aqueous ink comprising at least one coloring material selected from coloring materials for cyan, for magenta, for yellow, for red, for green and for blue,
an ink cartridge equipped with an ink storing section for storing the ink according to claim 1, head sections for respectively ejecting the ink stored in individual ink storing sections, and
supply means for supplying individual types of the ink from the respective ink cartridges to the respective head sections.

33. An image recording method comprising the steps of ejecting the ink according to claim 1, toward a recording medium surface and depositing the ink on the recording medium surface for the recording of an image.

34. The image recording method according to claim 33, wherein energy for ejecting the ink is thermal energy.

35. The image recording method according to claim 33, wherein energy for ejecting the ink is mechanical energy.

36. A color image forming method comprising the steps of:

ejecting a first aqueous ink comprising at least one coloring material selected from coloring materials for cyan, for magenta, for yellow, for red, for green and for blue toward a surface of a recording medium and depositing the ink to the surface; and ejecting a second ink according to any one of claim 1 toward a surface of a recording medium and depositing the ink to the surface.

37. The method according to claim 33 or 36, wherein the recording medium is plain paper.

\* \* \* \* \*

UNITED STATES PATENT AND TRADEMARK OFFICE
CERTIFICATE OF CORRECTION

PATENT NO. : 6,280,513 B1
DATED : August 28, 2001
INVENTOR(S) : Osumi et al.

It is certified that error appears in the above-identified patent and that said Letters Patent is hereby corrected as shown below:

Title page,
Item [56], References Cited, FOREIGN PATENT DOCUMENTS,
"0 802 2247 A2" should read -- 0 802 247 A2 --.

Column 1,
Line 13, "as" (second occurrence) should read -- as a --; and
Line 30, "for" should read -- for an --.

Column 2,
Line 37, "damaging" should read -- damage to --;
Line 41, "after" should read -- after being --; and
Line 44, "to" should read -- to the --.

Column 3,
Line 47, "to" (first occurrence) should be deleted.

Column 9,
Line 7, "$C_2H_5$," should read -- $C_2H_5$ --; and
Line 20, "another" should read -- other --.

Column 10,
Line 36, "chra-" should read -- chara- --.

Column 12,
Line 19, "surfactans" should read -- surfactants --.

Column 13,
Line 15, ".of" should read -- of --; and
Line 38, "the" should read -- of the --.

Column 14,
Line 52, "embodiment" should read -- embodiments --.

Column 20,
Line 16, "add" should read -- added --.

Column 21,
Line 13, "hour." should read -- hours. --.

UNITED STATES PATENT AND TRADEMARK OFFICE
CERTIFICATE OF CORRECTION

PATENT NO. : 6,280,513 B1
DATED : August 28, 2001
INVENTOR(S) : Osumi et al.

It is certified that error appears in the above-identified patent and that said Letters Patent is hereby corrected as shown below:

Column 23,
Line 10, "minimum" should read -- minimum. --.

Column 26,
Table 3, line 42, "Example" should read -- Example 1 --.

Column 27,
Line 58, "add" should read -- added --.

Column 32,
Line 64, "ethylene glycol    5 parts" should read
     -- ethylene glycol    5 parts
        water              52.85 parts --.

Column 41,
Line 65, "type" should read -- types --.

Column 42,
Line 5, "fastness" should read -- Fastness --.

Column 43,
Line 30, "teh" should read -- the --;
Line 31, "and" should read -- and Comparative Example 4. --; and
Line 33, "COMPARATIVE EXAMPLE 4." should be deleted.

Column 44,
Line 56, "wherein" should read -- where --.

UNITED STATES PATENT AND TRADEMARK OFFICE
CERTIFICATE OF CORRECTION

PATENT NO.   : 6,280,513 B1
DATED        : August 28, 2001
INVENTOR(S)  : Osumi et al.

It is certified that error appears in the above-identified patent and that said Letters Patent is hereby corrected as shown below:

Column 45,
Line 6, "$-NH_3^+$," should read -- $PO_3(M2)_2, -NH_3^+$, --;
Line 7, "$H_sCOR$," should read -- $H_2COR$, --; and
Line 65, "Ink" should read -- The ink --.

Signed and Sealed this

Twenty-eighth Day of January, 2003

JAMES E. ROGAN
*Director of the United States Patent and Trademark Office*